United States Patent [19]

Wi

[11] Patent Number: 5,438,794
[45] Date of Patent: Aug. 8, 1995

[54] FARMING SYSTEM FOR CULTIVATING CROPS

[76] Inventor: Gye-Sung Wi, #1-1101 Kumho-Mansion, 53 Sunwon-Dong, Yochon-shi, Chollanam-do, Rep. of Korea

[21] Appl. No.: 44,629

[22] Filed: Apr. 9, 1993

[30] Foreign Application Priority Data

Apr. 10, 1992 [KR] Rep. of Korea ............. 92-5921
Jun. 3, 1992 [KR] Rep. of Korea ............. 92-9829
Nov. 19, 1992 [KR] Rep. of Korea ............. 92-22816
Mar. 20, 1993 [KR] Rep. of Korea ............. 93-4197

[51] Int. Cl.$^6$ ........................................... A01G 9/00
[52] U.S. Cl. ..................................................... 47/17
[58] Field of Search ........... 47/17, 17 EC, 18, 17 MS, 47/17 B

[56] References Cited

U.S. PATENT DOCUMENTS 3,999,329 12/1976 Brais ..................... 47/17 EC

FOREIGN PATENT DOCUMENTS 2621448 4/1989 France ..................... 47/17 EC
1874 3/1992 Netherlands ............. 47/17 B Primary Examiner—Henry E. Raduazo
Attorney, Agent, or Firm—Birch, Stewart, Kolasch & Birch

[57] ABSTRACT

A system for cultivating and managing various crops according to the present invention provides a vinyl house A incorporating a spacious cultivation area therein without the use of supporting pillars, a track rail structure B and a track car C for easily conveying harvests and various units necessary for cultivation in the cultivation area, an agricultural chemicals spraying unit D for preventing the crops from being damaged by blight and harmful insects, and a heating unit E for producing warm air in cold weather and furnishing the air to the crops on the levees G through ducts F, whereby cultivating the crops even in cold weather due to the warm indoor air and producing the crops all year regardless of the change of seasons.

12 Claims, 23 Drawing Sheets

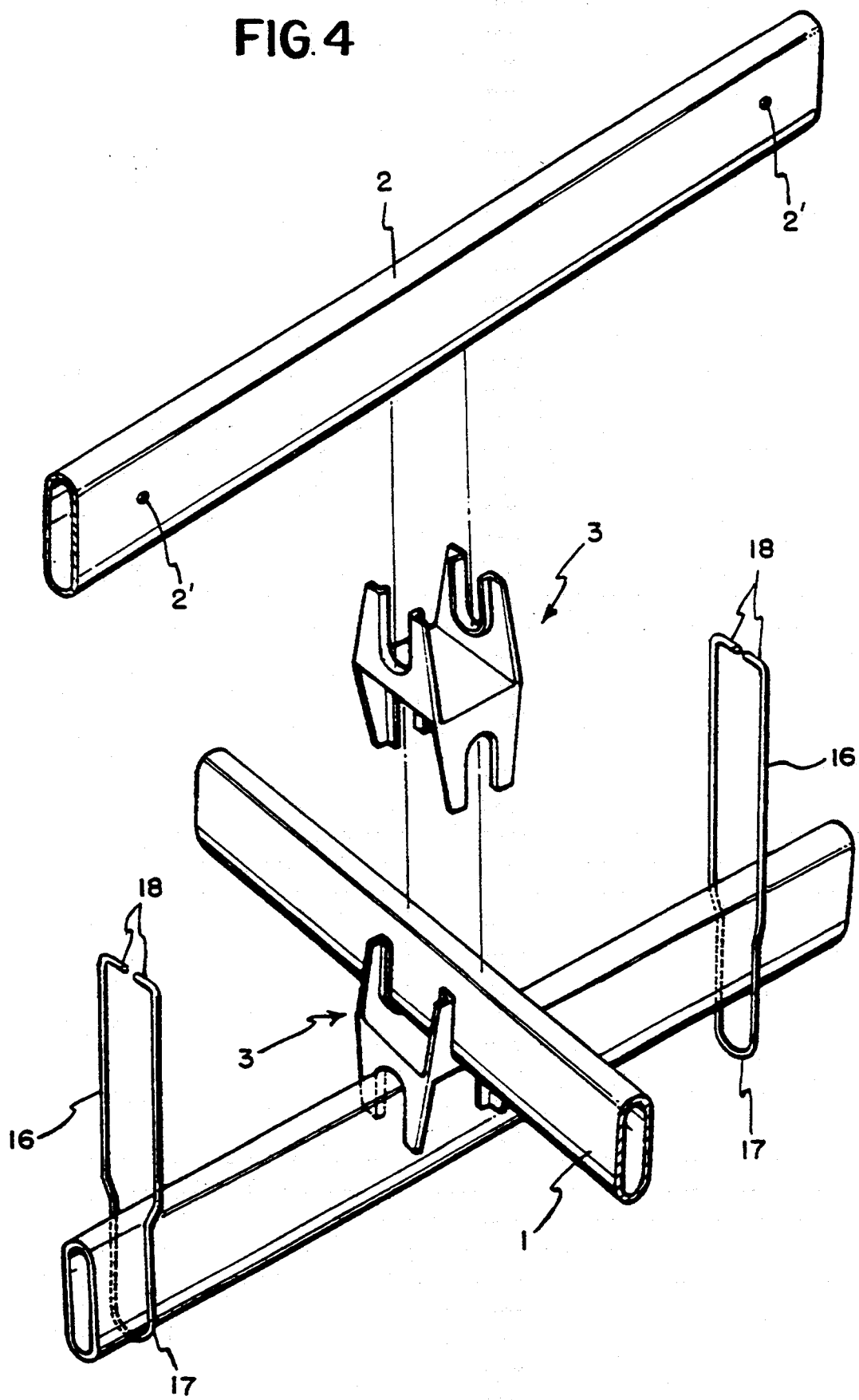

E

E

FARMING SYSTEM FOR CULTIVATING CROPS

BACKGROUND OF THE INVENTION

1. Field of the Invention

The present invention relates to a farming system for cultivating and managing various crops, and more particularly, to a farming system which includes a framework required to set up a vinyl house, various farming tools suitable to cultivate and manage seedlings in the vinyl house, track rails and orbiting cars running thereon for carrying the farming tools and/or harvests, an agricultural chemical spraying unit for preventing the crops from being damaged by blight and harmful insects and a temperature control unit for properly maintaining a temperature in the vinyl house.

2. Description of the Prior Art

Heretofore, a framework structure for such vinyl house and a hothouse has been proposed. However, any composite system suitable for cultivating and managing crops has not be disclosed. A conventional pipe used for setting up such a vinyl house has a substantially a circle-shaped section. In fact, the lengthwise extended pipe has an excellent resilience and is flexible, but it is weak in strength. Accordingly, distances between horizontal pipes and vertical pipes must be narrowed to set up a framework, and multiple pillars must be densely arranged to support the heavy framework. For this reason, not only is the cost of purchasing the resources increased but also the time require to set up the framework is increased considerably, whereby a total cost must be increased. Further, plural pillars are densely arranged to form such a vinyl house, and an effective farming area management is not achieved.

Construction of a hothouse is different from the framework of the vinyl house, but maintenance cost is increased when it is installed in a region where climate includes four seasons.

More specifically, the temperature in the hothouse is naturally controlled in spring and autumn. In summer, because the hothouse has a substantially closed construction, the indoor temperature of the hothouse is highly increased. Therefore, an air conditioner must be employed to control the temperature in the hothouse. Alternatively, in the winter season, the temperature in the hothouse is substantially decreased due to the cold outdoor temperature. For this reason, a heater arrangement is used to control the temperature in the hothouse.

Accordingly, costs of maintaining the hothouse are increased undesirably, whereby production cost of the crops is also expensive and competiveness is deteriorated.

SUMMARY OF THE INVENTION

Accordingly, an object of the present invention is to provide a farming system for cultivating various crops wherein a vinyl house is made up to provide a maximum cultivation area and various tools needed to cultivate the crops are installed in the house.

According to a preferred aspect of the present invention, pipes, having an originally circle-shaped section, used for setting up a framework of the vinyl house, are pressed to have a rectangular cross section. With this shape of the pipes, pressure is perpendiculary acted thereon and a strength is thus greatly improved. Accordingly, when the vinyl house is made up by using the rectangular pipes, pillars are not required to support the framework of the vinyl house, and therefore, a maximum farming area in the vinyl house is obtained.

Further, track rails are provided in the vinyl house according the present invention. In other words, the paired rails are narrowly arranged at a predetermined spacing. Each of the pair of rails has an upwardly opened rectangular section and plural brackets are provided at a lower side of a pair of the rails at a regular interval. A separate direction control unit is disposed at a position where the track rails are branched, so as to run an orbiting car along the rails. The car running on the track rails has upper and lower wheels so that the wheels roll over the rails while being engaged with the upper and lower sides of the rails to prevent the car from being separated from the rails or turned over.

Preferably, the car includes a driving means such as an electromotive motor. Alternatively, the car may be driven manually. Furthermore, the car may be defined such that multiple shelves are employed to carry the crops and/or various farming machines or tools needed to cultivate the crops. The farming machines or tools may be directly loaded on the car.

An agricultural chemical spraying unit which may be loaded on the car has upper and lower tanks in which agricultural chemicals and air mixed with each other are contained. As a result, the agricultural chemical is sprayed by air pressure in the tank.

According to the farming system of the present invention, a heating unit is employed to heat air in the vinyl house, for example, in the winter season so as to control to an optimum degree suitable to grow the crops.

In accordance with the farming system of the present invention, the vinyl house is set up without using any pillars to thereby provide a maximum farming area, and the car is run on the track rails which are installed in the farming area to carry the crops and/or the farming machines needed to cultivate the crops. Furthermore, the heating unit optimumly controls the indoor temperature of the vinyl house in the winter season to cultivate the crops effectively.

The above and other objects, features and advantages of the invention will be apparent from the following description taken with reference to the accompanying drawings.

BRIEF DESCRIPTION OF THE DRAWINGS

FIG. 4 is an exploded perspective view concretely showing an assembly structure of another example of a vinyl house framework according to the present invention;

FIG. 17A is a front view of the rails shown in FIG. 16;

FIG. 18C is an example of the track rail installed on a slippery ground.

DETAILED DESCRIPTION OF THE INVENTION

Hereinafter, the present invention will be described in connection with the accompanying drawings.

Figure 1:
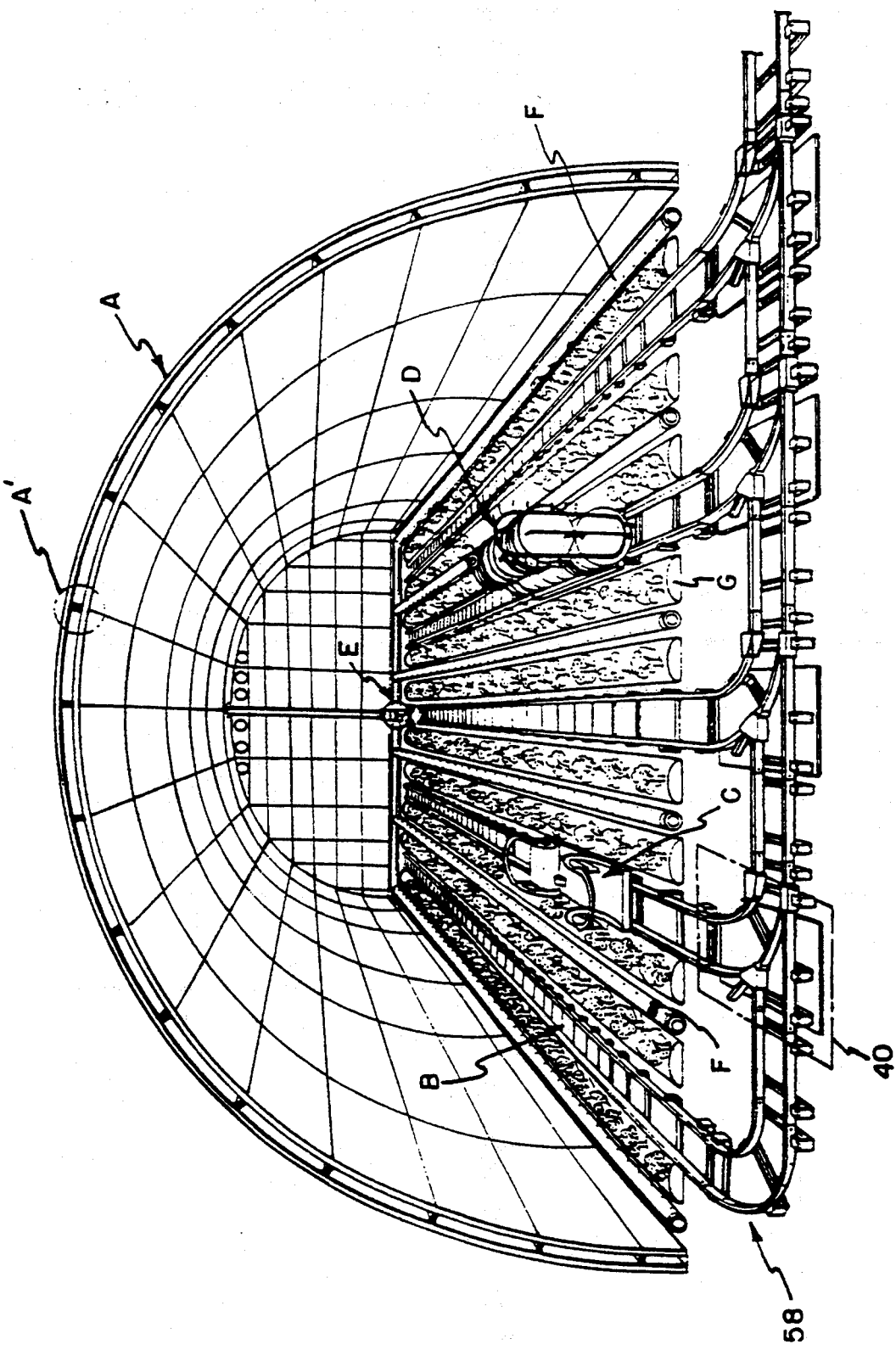
FIG. 1 is a perspective view showing an entire structure of a farming system according to the present invention.

Referring to FIG. 1 showing an entire construction of a farming system for cultivating various crops according to the present invention, reference numeral A denotes a vinyl house which is set up without using any pillars for supporting the framework of the vinyl house according to the present invention. Multiple levees G are defined on a farming area in the vinyl house A and plural ducts F and track rail 20 are alternately arranged between the levees G. The ducts F are connected to a heating unit E which is arranged at an inner side of the vinyl house A and each of the rails 20 is connected to a running rail through a direction control valve 40 and a curved connecting rail 58 which are arranged in the vinyl house A.

The construction of the farming system according to the invention will be now described in detail.

Figure 2:
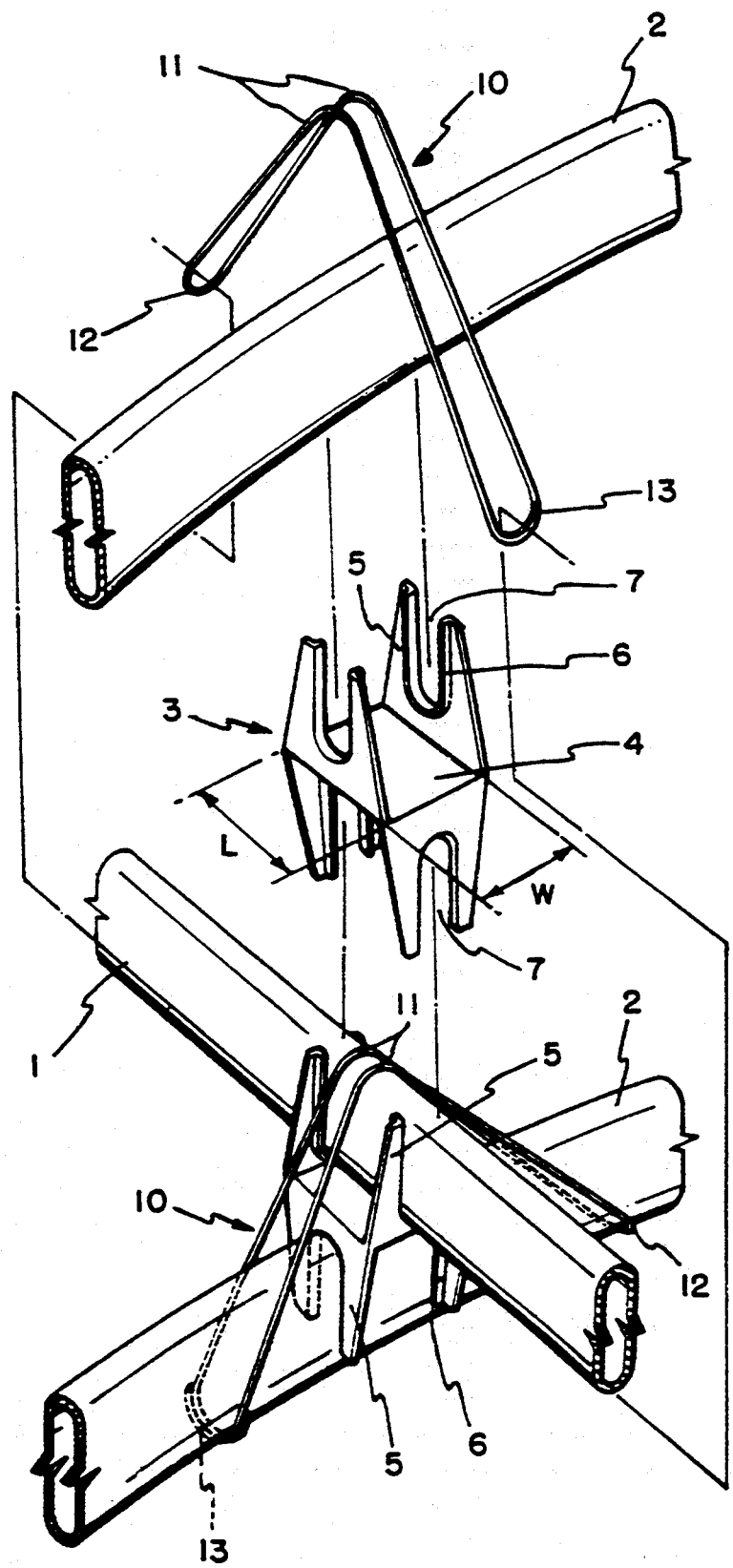
FIG. 2 is a partially exploded view illustrating of a framework assembly for setting up a vinyl house which is employed to the present invention.
Figure 3A:
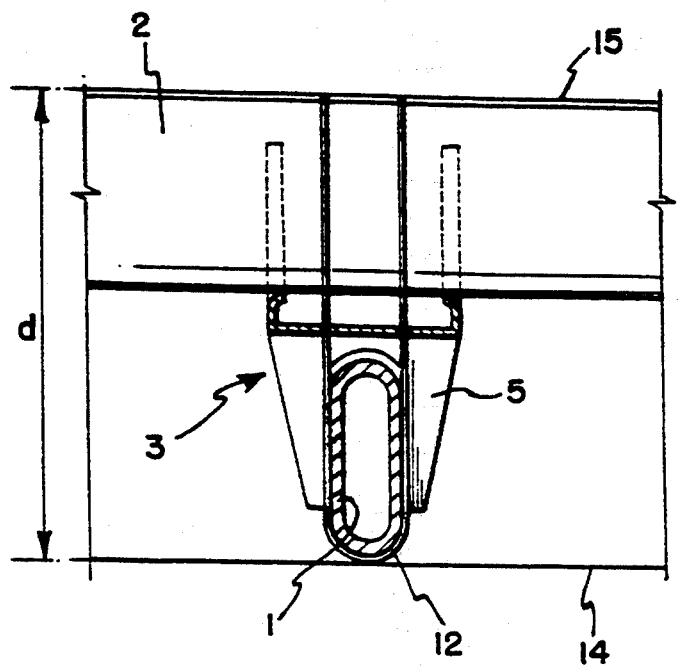
FIG. 3A is a view showing a horizontal bar and a vertical bar assembled in single structure to set up the framework of the vinyl house shown in FIG. 2.
Figure 3B:
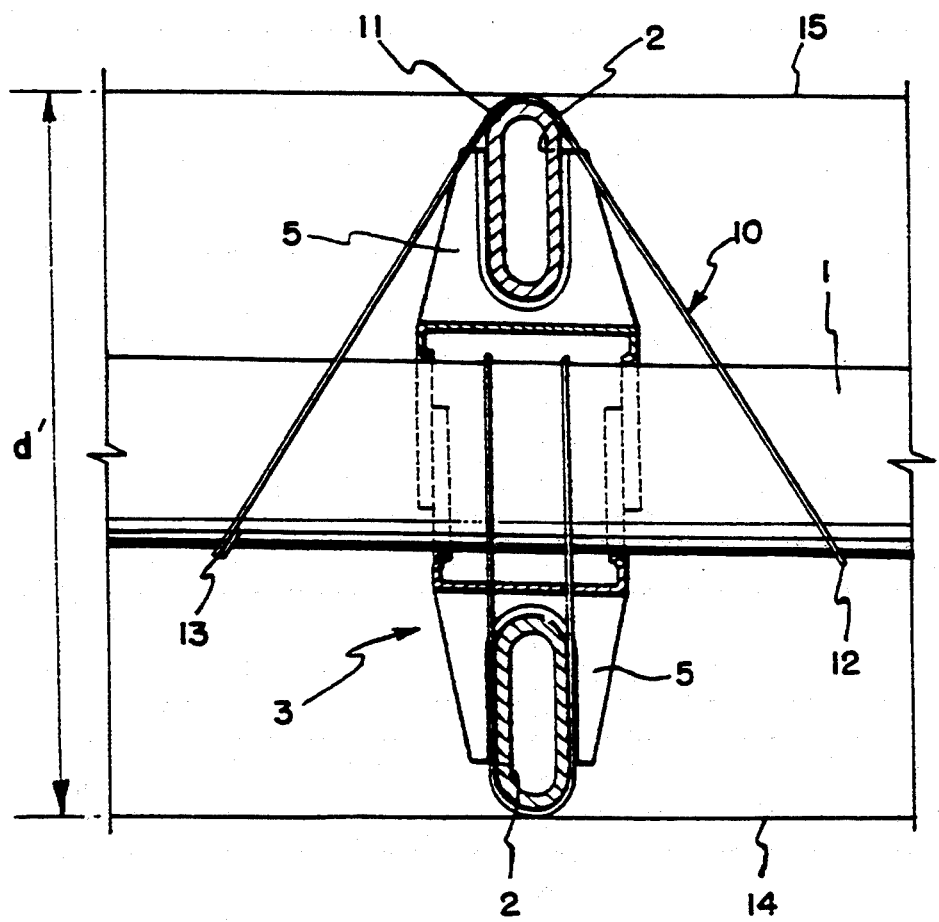
FIG. 3B is a view showing a horizontal bar and a vertical bar assembled in double structure to set up the framework of the vinyl house shown in FIG. 2.

FIG. 2 is a partially exploded perspective view showing an assembled structure of a portion A' of the vinyl house A and FIGS. 3A and 3B are views showing a completed structure of the assembly shown in FIG. 2, wherein (A) is a view showing an assembled structure of a horizontal bar 2 and a vertical bar 1 in single structure and (B) is a view showing a structure that the horizontal bars 2 and 2' are assembled to upper and lower sides of the vertical bar 1.

According to the assembly structure of the vinyl house A, the vertical bar 1 and the horizontal bar 2, each of which is made by a pipe having a rectangular shape, are arranged in a continuously crossing manner. A connecting member 3 is employed to support the mutually crossed horizontal and vertical bars 2 and 1, and a coupling pin 10 surrounds the mutually opposed pipes and is fixed to the horizontal bar 1 or vertical bar 2 to completely form the framework of the vinyl house A.

The connecting member 3 has a pair of supporting pieces 5 which are oppositely defined at the upper and lower sides of a flat plate 4. At the supporting pieces 5, a reinforcing side 6 is defined and has a recess 7 which is inwardly formed, respectively. The coupling pin 10 made by a single steel line is curved at both sides centering with the bend portion 11. One side of the coupling pin 10 is closed and serves as a fastening portion 12 and the other is formed by cutting the steel lines in an arc shape and serves as a coupling portion 13.

Referring to FIG. 3A, the horizontal bar 2 and vertical bar 1 are inserted in the upper and lower recesses 7 of the connecting member 3. Then, the fastening portion 12 of the coupling pin 10 is fixed in place by expanding the coupling portion 13 right and leftward and inserting the coupling pin 10 upwardly from a side of the vertical bar 1 while the coupling portion 13 of the coupling pin 10 is fixed to an opposed side of the vertical bar 1.

After the framework is completely assembled, a vinyl is wrapped on the framework in single or double layer. According to the present invention, a double layered vinyl is wrapped on the framework as shown in the drawing. More specifically, an inside vinyl 14 is wrapped immediately below the vertical bar 1 while an outside vinyl 15 is wrapped on the horizontal bar 2. In this case, a narrow distance is defined between the inside vinyl 14 and the outside vinyl 15 and an air gap is thus narrowed there between. This causes a relatively lower effect for keeping warm air as compared with FIG. 3B. However, this structure can be preferably employed in relatively warm regions and/or seasons.

Referring to FIG. 3B, there is shown a case that the horizontal bars 2 are coupled in double structure to the vertical bar 1. This assembling operation is effected in the manner as previously described. Upper and lower connecting members 3 are coupled at the same position of the vertical bar 1. Accordingly, the connecting members 3 must be formed such that the upper and lower connecting members 3 are easily coupled with each other.

That is, the flat plate 4 of the connecting member 3 has different horizontal and vertical lengths L and W in such a way that the inside length of the horizontal length L is accommodated to the vertical length W. When the twofold vinyl is provided on the double-structured horizontal bars 2, a distance d1 between the inside vinyl 14 and the outside vinyl 15 is larger than that of the structure shown in FIG. 3A. Accordingly, an air gap defined between the vinyls 14 and 15 is thicker than that of the structure in FIG. 3A whereby a good heat insulation effect is obtained.

FIGS. 4 through 13 show another assembly structure of the vinyl house.

Figure 5:
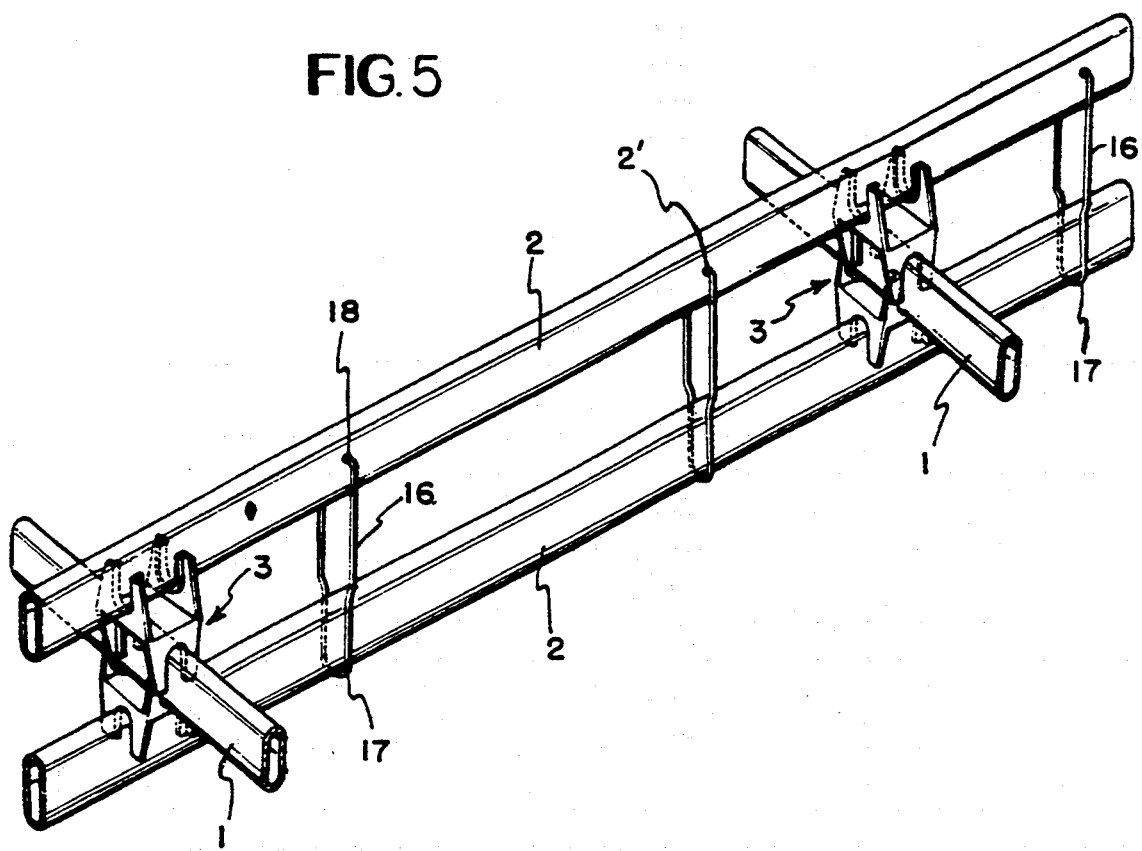
FIG. 5 is a view showing an assembled structure of the example shown in FIG. 4.

The pipes used as the horizontal and vertical bars 2 and 1 have a substantially oval section, respectively. The connecting members 3 are inserted between the horizontal bar 2 and the vertical bar 1 to fix them and a coupling pin 16 fixes the horizontal bar disposed on the upper and lower sides of the vertical bar 1. More specifically, the vertical bar 1 and the horizontal bar 2 are connected as a cross and then coupled by the connecting members 3 to form the framework of the vinyl house. Multiple connecting member 3 are positioned on the same vertical line of the upward and downward sides of the vertical bar 1. The horizontal bar 2 is inserted in the recess 7 of the respective connecting members 3. The coupling pin 16 is located such that a coupling portion 17 is engaged with the horizontal bar 2 and a coupling piece 18 is fixedly inserted in coupling opening 2' of the upper horizontal bar 2. FIG. 5 shows the assembled structure of the present invention thus constructed.

Figure 6:
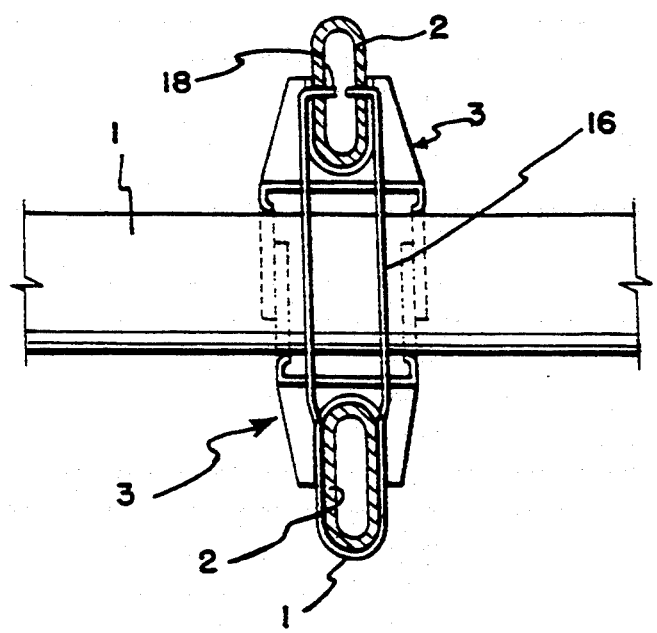
FIG. 6 is a view showing the assembled structure shown in FIG. 4, as viewed from the side of the horizontal bar.
Figure 7:
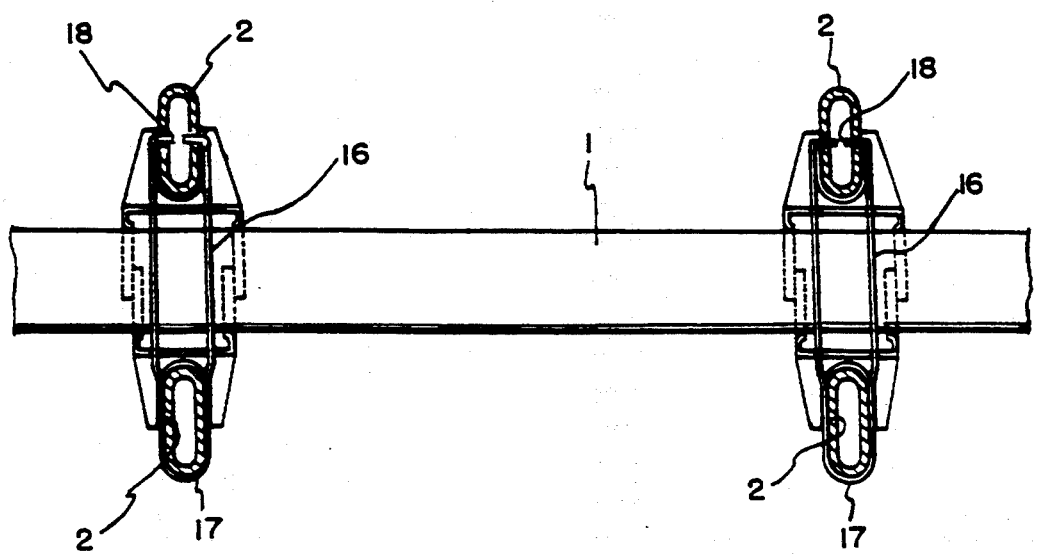
FIG. 7 is an exemplary view illustrating a continuous connection method of the horizontal bar to the vertical bar and showing the assembled example shown in FIG. 4, as viewed from a side of the horizontal bar.
Figure 8:
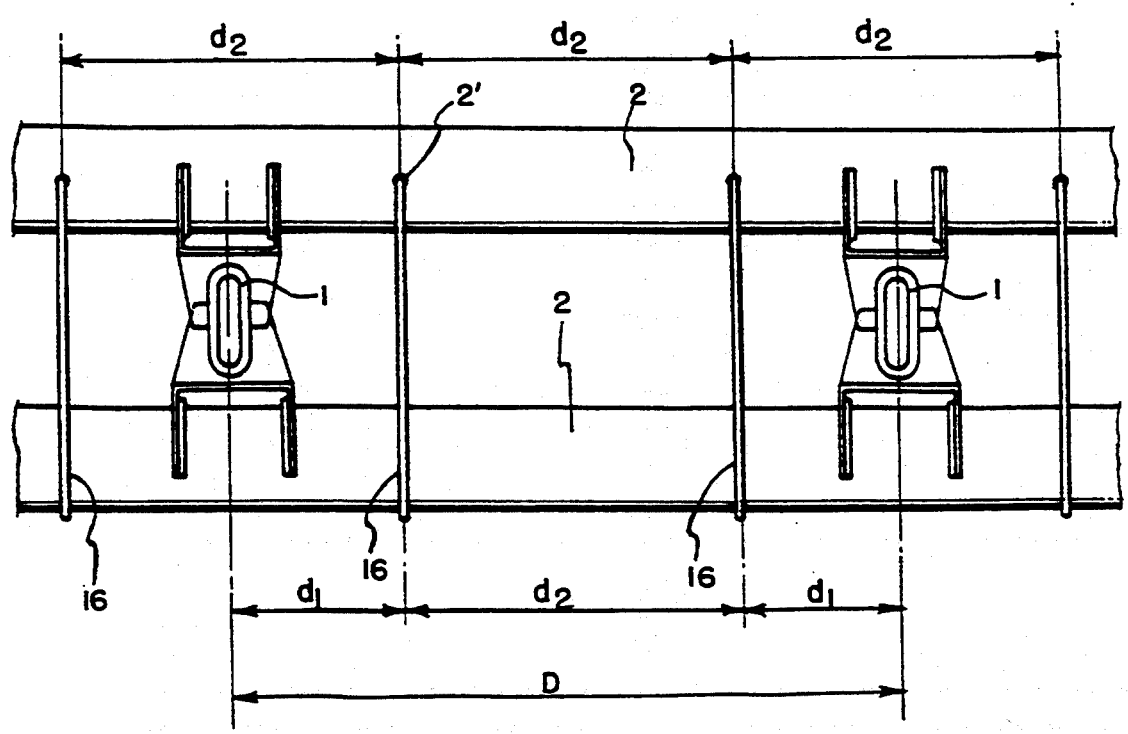
FIG. 8 is a view illustrating the assembled structure shown in FIG. 4, as viewed from the side of the vertical bar and showing an example of a connection pin coupled between the horizontal and vertical bars.

FIG. 6 is a view from the side of the structure shown in FIG. 5, FIG. 7 is an exemplary view showing the horizontal bars 2 continuously arranged at the upper and lower sides of the vertical bar 1 and FIG. 8 shows an exemplary view of the structure shown in FIG. 7 as viewed from the side of the structure.

The connecting members 3 are inserted and arranged on the same vertical line of the vertical bar 1 and the horizontal bars 2 are then inserted in the respective connecting members 3 in such a way that the horizontal bars 2 are perpendicularly intersected with the vertical bar 1. The contacted portions of the bars 1 and 2 are supported by the recesses 7 defined at the central portion of the reinforcing sides 6 of the connecting members 3 in which the bars 1 and 2 are inserted. As a result, the bars 1 and 2 are securely supported by the connecting members 3. A rectangular space is defined between the connecting members 3 and the upper and lower horizontal bars 2 intersect the vertical bar 1 and are supported by the connecting member 3. Accordingly, the framework has a highly improved strength and can be prevented from being distorted or deformed.

In particular, the coupling pins 16 are disposed at regular intervals as shown in FIG. 8. The connecting members 3 are provided between the coupling pins 16. According to the present invention, it should be noted that the connecting members 3 may be located between adjacent coupling members 16 or every other coupling pin 16. That is, the coupling pins 16 are disposed with a relatively large space D that is defined by adjacent connecting members 3. The space D is evenly divided by a minute space d1 between the connecting member 3 and the coupling pin 16 or a minute space d2 between the coupling pins 16. Therefore, the supporting points (i.e., supporting interval) are more more closely ensured than the coupling method in which the connecting members 3 and the coupling pins 16 are positioned on the same line in the large space D. This causes the framework to be assembled with a high strength.

Figure 9A:
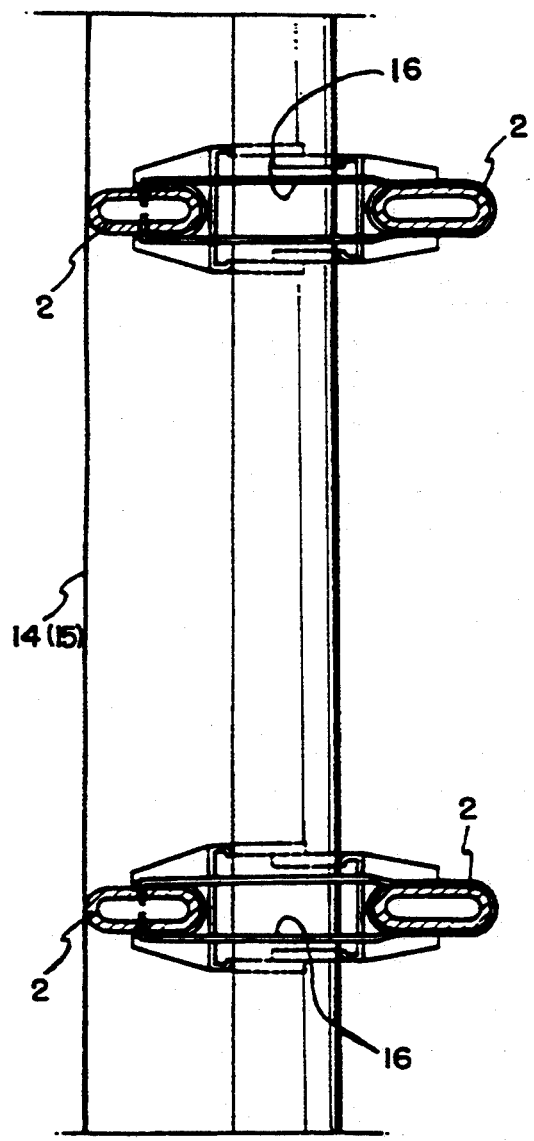
FIG. 9A is an exemplary view showing a vinyl wrapped on the framework shown in FIG. 4.
Figure 9B:
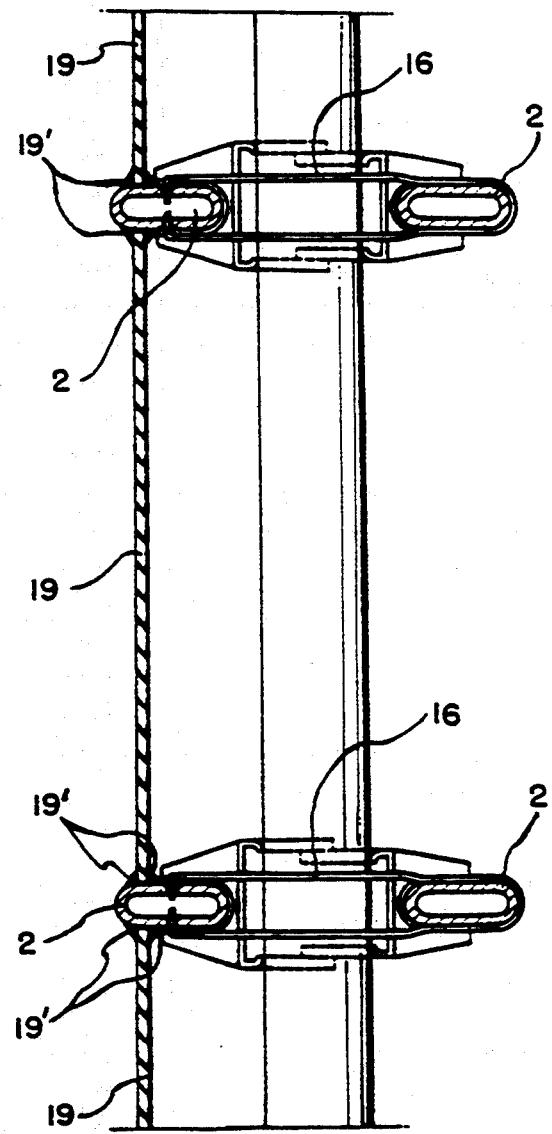
FIG. 9B is an exemplary view showing a plate glass disposed between the horizontal bars of the framework shown in FIG. 4.

According to the present invention, as shown in FIG. 9A a vinyl is wrapped on the framework assembled as previously mentioned. The vinyl may be substituted by a plate glass. More specifically, FIG. 9(A) is an exemplary view showing a case in which the vinyl is wrapped on the framework and FIG. 9(B) is an exemplary view showing a case in which the plate glass is mounted between the horizontal bars 2, wherein a silicon material 19' is employed to bind the plate glass and the horizontal bars 2.

Figure 10:
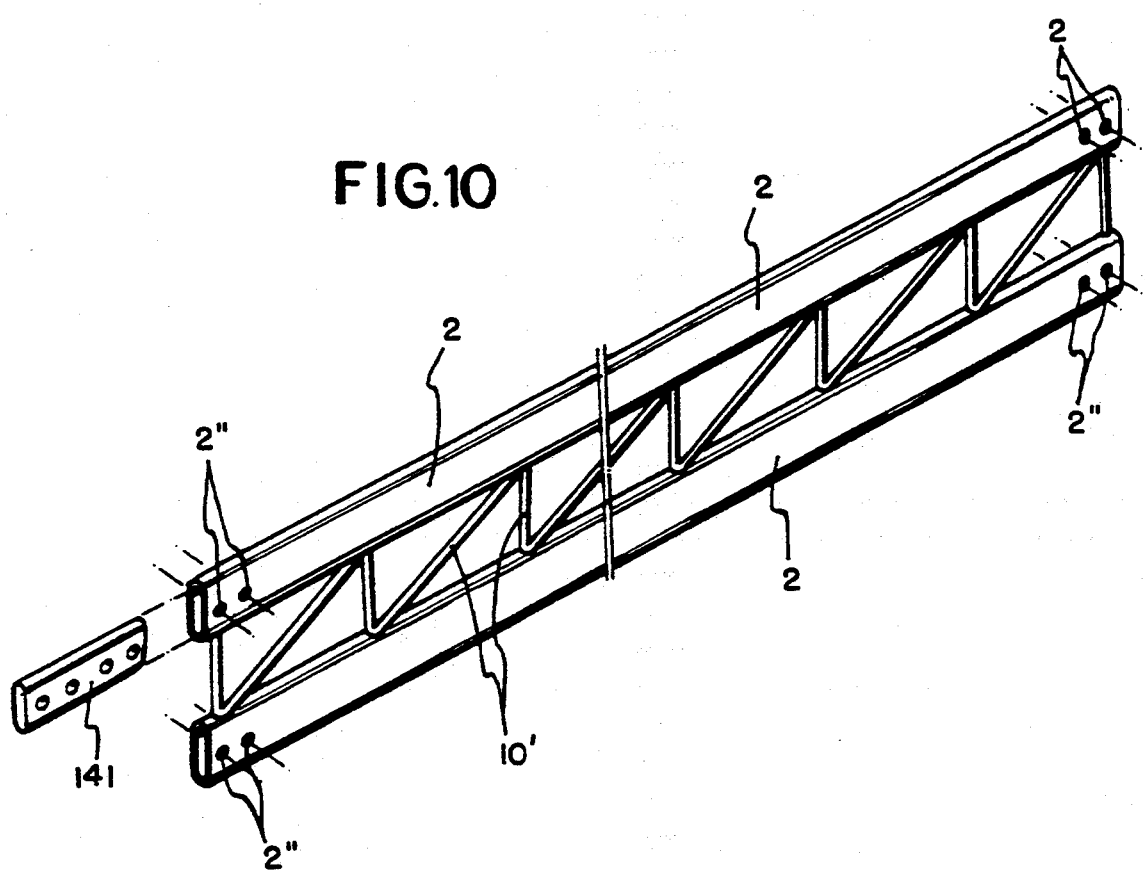
FIG. 10 is a view illustrating a horizontal bar frame integrally formed by a pair of the horizontal bars in the framework of the vinyl house.
Figure 11:
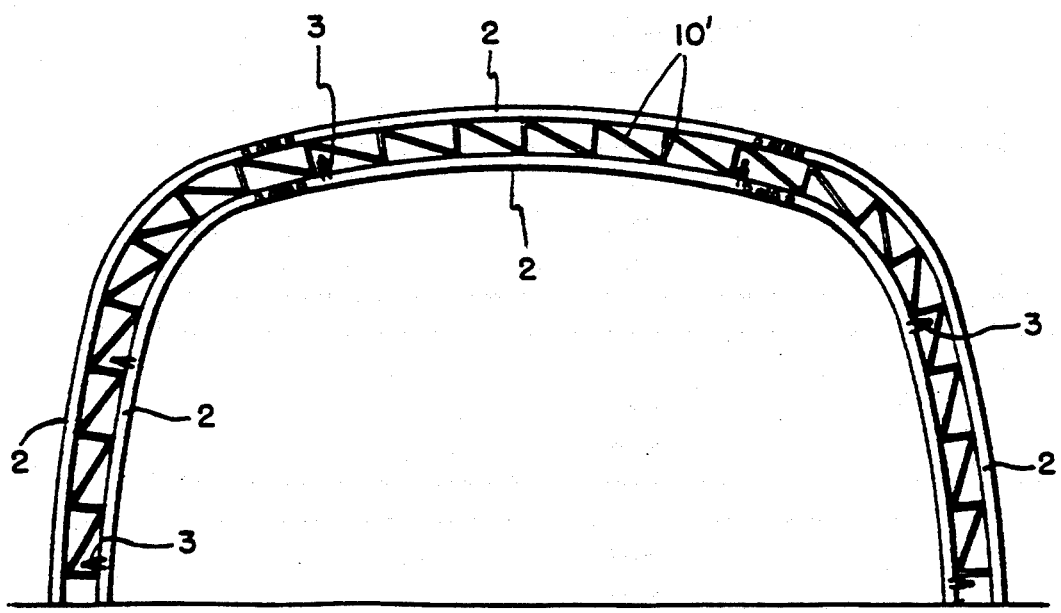
FIG. 11 is a view showing a structure assembled by the horizontal bar frame.

In FIG. 10, when the horizontal bar 2 made of a pipe having a rectangular shape is secured by a supporting bar 10' in such a way that the rectangular surface is positioned on the same vertical line, the strength of the horizontal bar assembly can be further improved. In this case, the supporting bars 10' are formed in a vertical arrangement and an inclined arrangement and the vertical and inclined supporting bars 10' are alternately arranged. Both ends of the respective horizontal bars 2 are formed with a coupling opening through which a connecting piece 141 is inserted to the adjacent horizontal bar 2 and integrally secured with the bars 2 by means of a bolt and a nut. The horizontal bar frame thus connected and assembled is shown in FIG. 11.

Figure 12:
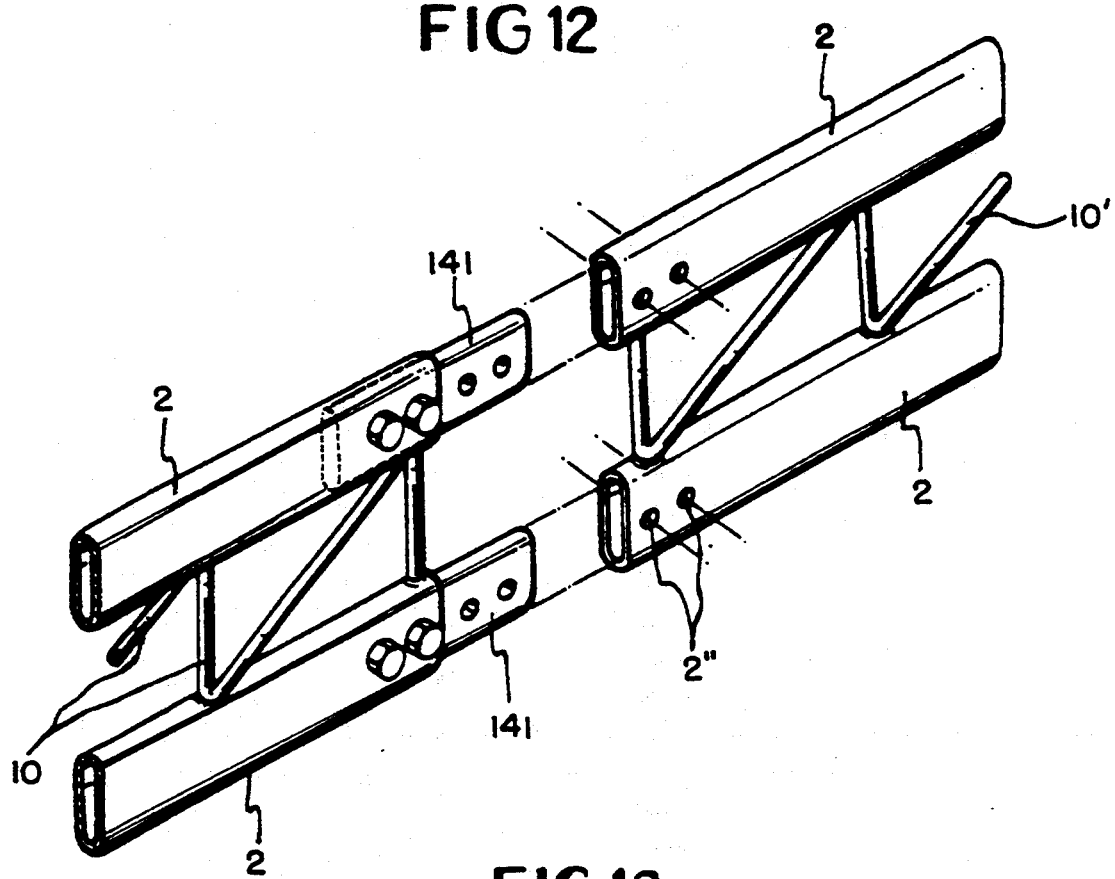
FIG. 12 is an enlarged view illustrating a connecting condition of the horizontal bar frame.
Figure 13:
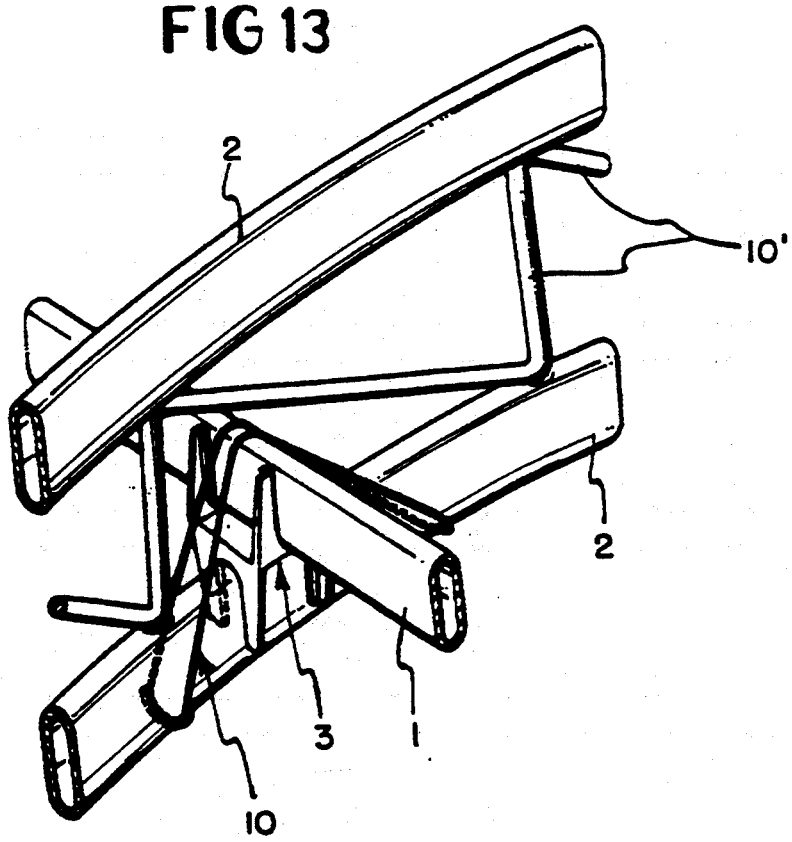
FIG. 13 is an exemplary showing the horizontal bar frame fixed to the vertical bar.

A separable connecting piece 141 is inserted in the ends of the adjacent horizontal bars 2 and a bolt which is penetratingly inserted from one side to the other side of the horizontal bar 2 is fastened by a nut whereby the horizontal bar frame is completed, as shown in FIG. 12.

After the horizontal bar frames are arranged at a regular interval, the vertical bars 1 which perpendicularly intersect the horizontal bar 2 of a side of the horizontal bar frame is fixed to the horizontal bar 2 at a regular interval. Such fixing of the vertical bar 1 is performed by inserting the connecting members 3 between the horizontal bar 2 and the vertical bar 1 and securing them by means of the bend coupling pin 10.

Accordingly, the assembling structure which is formed with the horizontal bar frames having a further improved strength is provided with an assembly having an extremely improved durability. Also, since the horizontal bar frame and the vertical bar 1 are spaced at a relatively widened interval; resource materials needed to set up the vinyl house A can be saved considerably and, thus, the costs can also be reduced, with a result that the assembled structure such as a vinyl house is strong in strength.

In other words, the horizontal bars 2 and the vertical bars 1 for setting up the vinyl house A are made up by using the rectangular-shaped pipes having a strength higher than ordinary cylindrical pipes. Accordingly, the framework structure formed by using the rectangular pipes is very strong in strength and the vinyl house which is larger than the conventional vinyl house can be provided without employing any pillars for supporting the framework, wherein the farming area can be optimally provided ensured and the crops can be effectively cultivated.

Referring to FIGS. 14 through 23B, the track rail structure B on which the car having the crops and/or various farming tools such as the agricultural chemical spraying unit and the like loaded thereon is illustrated.

The track rail structure B includes the track rails 20, the direction control unit 40, the straight connection rail 57 and the curved connection rail 58. Structure B basically has rails and brackets. The rail is bent at upper and lower sides in a rectangular shape, as viewed from the cross-section thereof and the brackets are provided evenly to a pair of the rails to form the track rails.

Such track rails are produced in constant length and connected with each other. Accordingly, the rail having a rectangular section allows the car to run smoothly with the crops and/or the farming tools loaded thereon.

Figure 14:
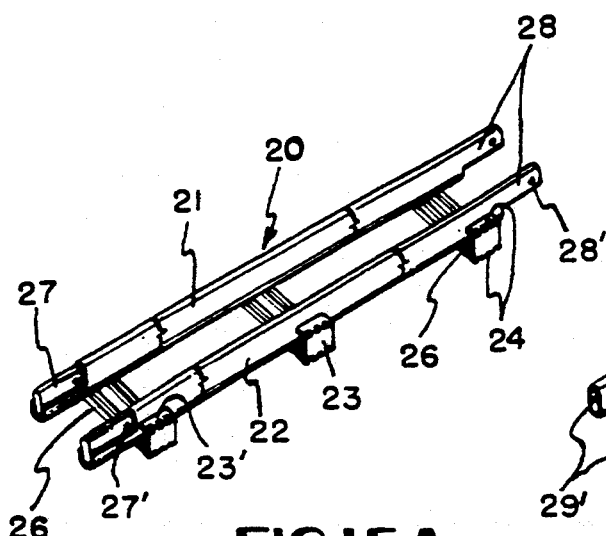
FIG. 14 is a perpective view of track rails which are partially omitted and employed in the present invention.
Figure 16:
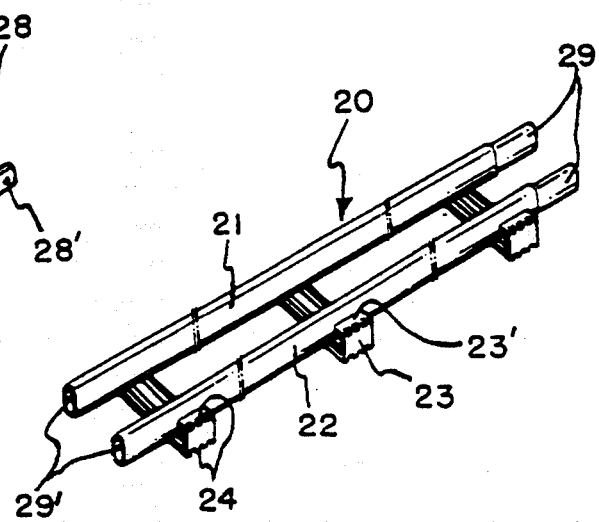
FIG. 16 is an exemplary view showing further rails modified according to the present invention.
Figure 15A:
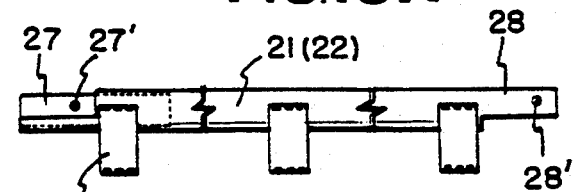
FIG. 15A is a front view of the track rails shown in FIG. 14.
Figure 15B:
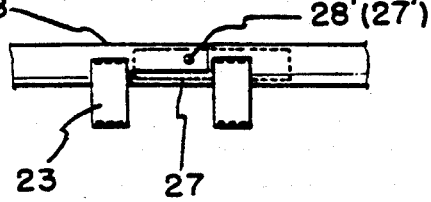
FIG. 15B is a view showing the rails connected with each other shown in FIG. 14.
Figure 17B:
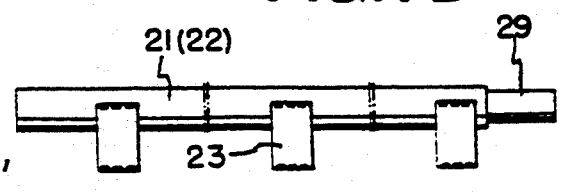
FIG. 17B is a view showing the rails connected with each other in FIG. 16.
Figure 17B:
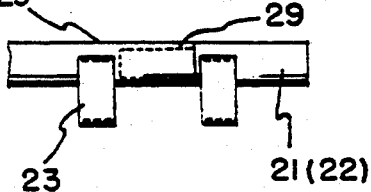

FIG. 14 is a perspective view showing an example of the track rail 20 in which the central portion is omitted and FIGS. 15A and 15B are a side view of the track rail 20 shown in FIG. 20 and an exemplary view illustrating the connection of track rails 20. FIG. 16 is a view showing another example of the track rail 20 and FIGS. 17A and 17B are a side view and exemplary connection view of the track rail shown in FIG. 16.

Figure 18A:
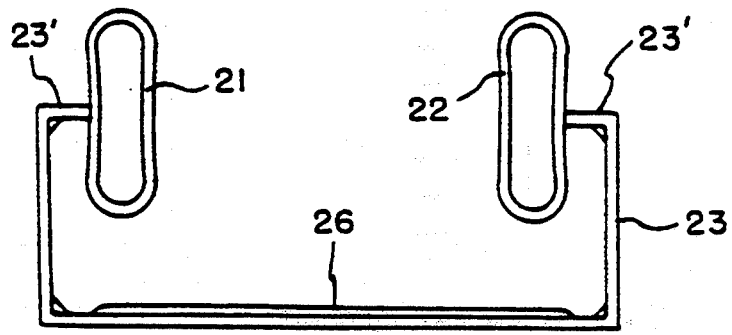
FIG. 18A is a side view of the track rails employed in the present invention.
Figure 18B:
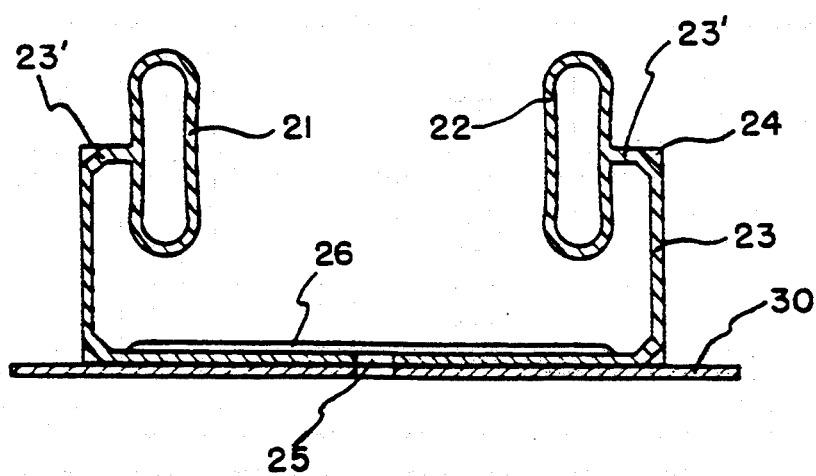
FIGS. 18B and 18C are cross-section view showing a reinforcing plate or side support provided to the rails shown in FIG. 18A.
Figure 18C:
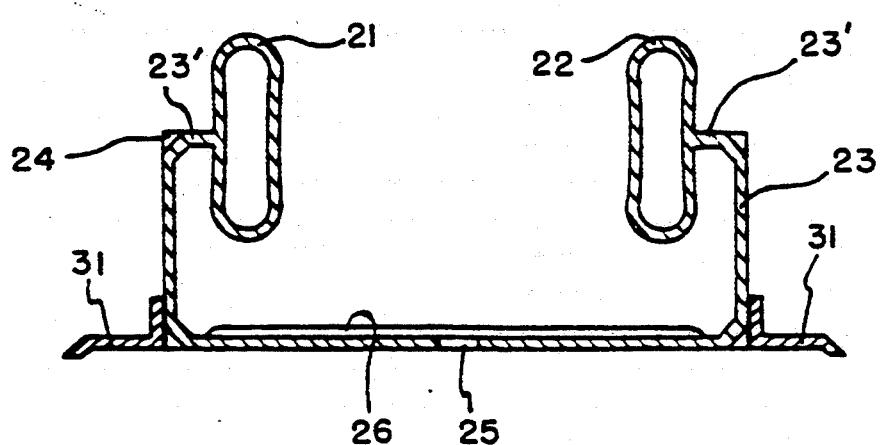

FIG. 18A is a front view of the track rail and FIGS. 18B and 18C are exemplary views showing the track rail having a reinforcing plate 30 and a side support 31 defined on the bottom surface and the side surface thereof, respectively.

The rectangular rail pairs 21 and 22 are bent at the upper and lower ends thereof and have a hollow portion 29' defined therein, respectively. The brackets 23 having an upwardly opened shape are provided to the paired rails 21 and 22 at a regular interval to form the track rail 20. The brackets 23 are located at the lower side of the rails 21 and 22. An inward piece 23' is formed on the external surface of the respective rails 21. An inclined reinforcing portion 24 and a bending portion 26 are formed on corner portions and flat plate of the bracket 23 to reinforce the strength of the bracket 23. A fixing hole 25 is formed at the center of the flat plate of the bracket 23. Such track rails 20 thus formed are manufactured in a constant length and continuously connected to each other by way of a connection method which will be later described.

First, as shown in FIGS. 14 and 15A, both ends of the rail are cut in constant length and removed. Consequently, any one of the ends of the rail is inserted with a fixing piece 27 having a fixing hole 27' defined therein and the other is formed with an insertion portion 28. Accordingly, the exemplary track rail 20 can be connected as shown in FIG. 15B. In this case, the insertion portion 28 is formed with a coupling hole 28' in conforming to the fixing hole 27' of the fixing piece 27.

When any one of the track rail 20 is connected to the other track rail 20, the insertion portion 28 of the rail is positioned to surround the fixing piece 27 of the other rail and a separable fixing pin (not shown) is inserted into the coupling hole 28' so as to secure the rails.

FIGS. 16 and 17A illustrate another example of a rail connecting method. In the drawings, the insertion pieces 29 are inserted into the hollow portion 29' of the ends of the respective rails 21 and 22 in the track rail. When a series of the track rails 20 are connected with each other, the hollow portion 29' of one rail is inserted with the insertion piece 29 of the other rail, as shown in FIG. 17B.

Accordingly, a required length of the track rails 20 can be continuously connected. Particularly, when the track rails 20 are further extended, they can conform to a condition of the ground. Alternatively, the rails 20 may be provided with the bracket 23 having a proper adjunt additionally equipped thereto.

FIG. 18A is an exemplary view showing the track rail 20 installed in an ordinary place. According to this arrangement, a distance between the rails 21 and 22 is within a range of 20 cm or less. The track rail arrangement can be applied in a narrow farming area and the crops can be cultivated without being affecting by the track rails 21 and 22.

Referring to FIG. 18B, an example in which the track rail arrangement is installed on a weak ground is illustrated. A separate reinforcing plate 30 is additionally defined on the bottom surface of the bracket 23 so as to prevent the track rail 20 from being subsided in the weak ground.

FIG. 18C illustrates an example of the track rail installed on slippery ground. That is, a side support 31 is formed on the side surfaces of the bracket 23 so as to prevent the track rail 20 from being biased.

As mentioned above, the provision of the reinforcing plate 30 or side support 31 to the bracket 23 prevent the track rail 23 from being deformed or damaged due to subsidence or tendancy of a part of the track rail 20 to ensure the semi-permanent use of the track rail 20 without performing the improvement and repair therefor.

In accordance with the present invention, the track rail assembly B has separable devices mounted at positions where the rails are intersected or branched, as shown in FIGS. 19 to 23B.

Figure 19:
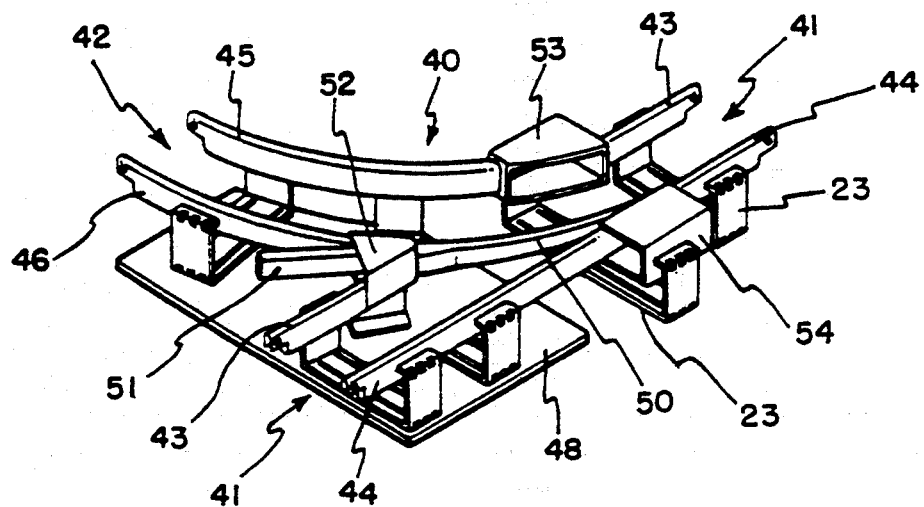
FIG. 19 is a perspective view of a direction control unit disposed at intersections of the rails.
Figure 20A:
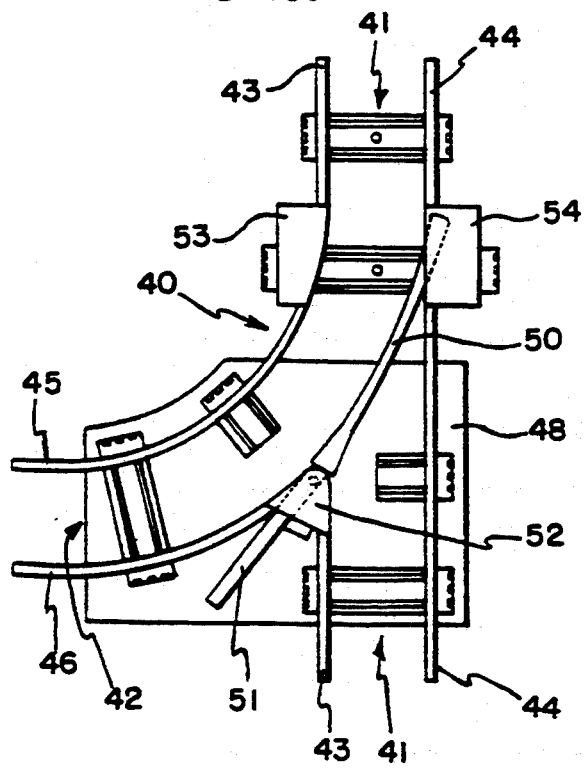
FIGS. 20A and 20B are views showing a directional control unit of a curve and/or straight running conditions.
Figure 20B:
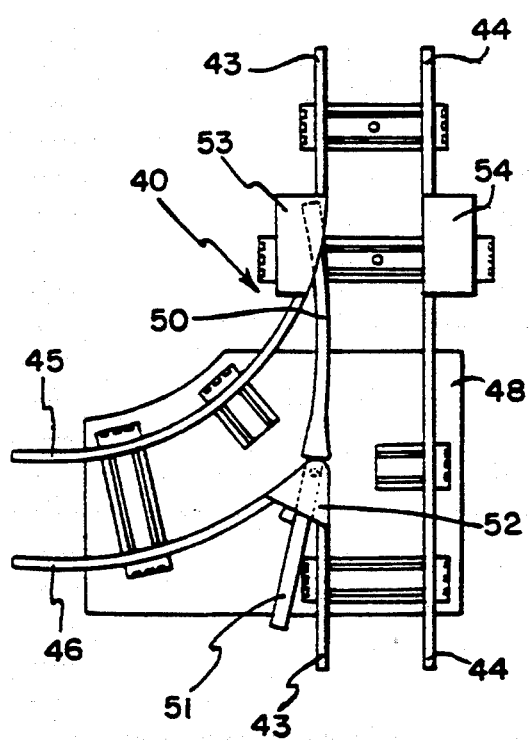
Figure 21:
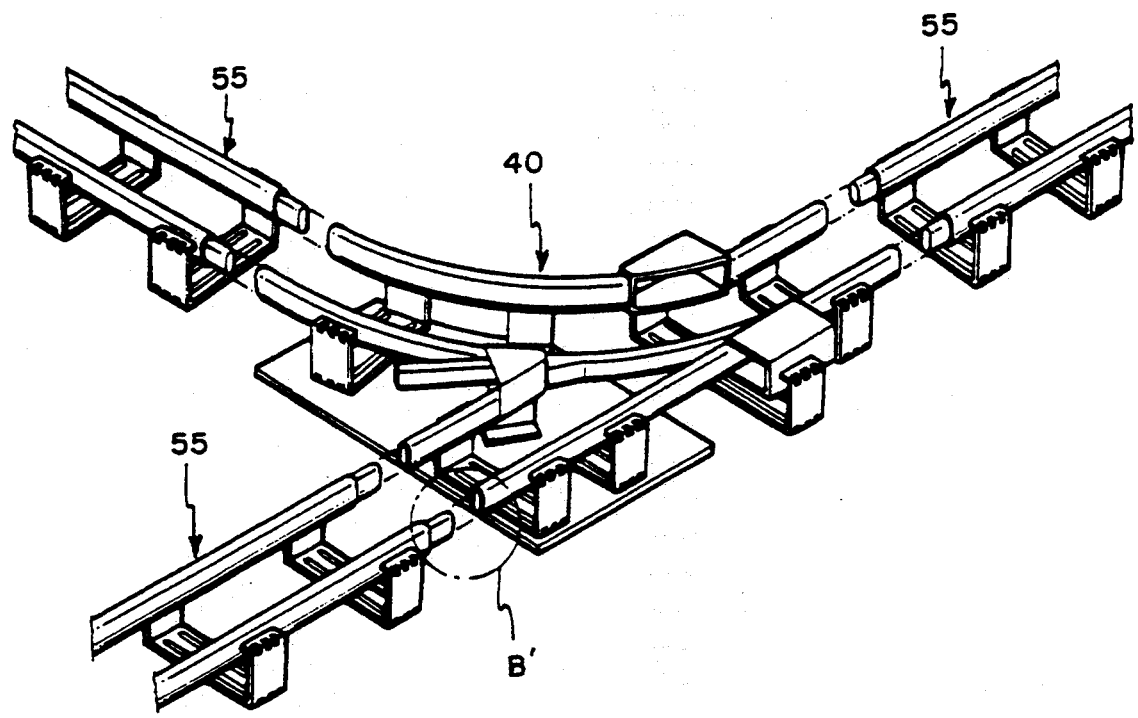
FIG. 21 is a perspective view showing the rails coupled to the direction control unit.
Figure 22:
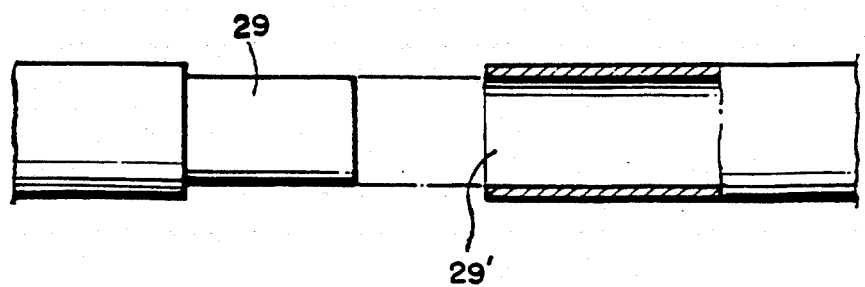
FIG. 22 is a partially exploded cross-section view showing a connection example of a portion "A" in FIG. 21.

FIG. 19 is a perspective view of the direction control unit 40 and FIGS. 20A and 20B are example views illustrating the direction control unit which is set to a curve running condition and straight running condition, respectively. FIG. 21 is an exemplary view illustrating a connection of the running rail 55 to the direction control unit 40 and FIG. 22 is an exploded view illustrating a connection of portion B' where plural rails are connected to each other. The direction control unit 40 is located at a portion where the rail in the track rail structure 20 is branched and controls the rails to the curve running or straight running condition. The direction control unit 40 is constructed as will be described later.

A straight rail 41 and a curved rail 42 are connected so that an end of the curved rail 42 is continuously connected to the straight rail 41. A left receiving box 53 and a right receiving box 54 are mounted at the opposed portions of the rails thus connected. The rails are partially removed at a portion where an inside linear rail 43 and an outside curved rail 46 are intersected, and a direction changing support 52 which includes a handle externally exposed and a changable rail 50 having an end received in the right or left receiving box 54 or 53 is disposed at a crossing point of the rails partially removed. The changable rail 50 has an inside curved surface and an outside linear surface. Preferably, the direction control unit 40 includes a supporting plate 48 on which the rails and brackets are mounted, and can be provided as standardized goods.

The direction control of the direction control unit 40 thus constructed is performed as illustrated in FIGS. 20A and 20B.

Referring to FIG. 20A showing the direction control unit 40 set to a curve running condition, the end of the changable rail 50 is received in the right receiving box 54 to form a curved rail. At this time, the inside curved surface of the changable rail 50 has a curvature substantially equal to a concentric circle of the curved inside rail 45. Accordingly, the car which will be described later is smoothly changable in direction while running on the curved rails.

Referring to FIG. 20B, there is shown the track rail structure 20 set to a linear running condition. The end of the changable rail 50 is received in the left receiving box 53 to form a straight rail. An outside linear surface of the changable rail 50 is located on the same line as the inside linear rail 43 and is arranged in parallel with the linear rail 44, so that the car moves smoothly on the rails.

Such a change of the running direction in the direction control unit 40 is easily achieved by the handle 51. More specifically, as the handle 51 is operated rightward and leftward, the changable rail 50 is moved in a direction opposite to the handle and the end of the changable rail 50 is thus received in the right or left receiving box 53 or 54, thereby easily changing the changable rail 50 to a straight running or curve running.

In the direction control unit 40, as shown in FIG. 21, rails 55 and 55' are connected to the ends of the straight rail 41 and the curve rail 42, respectively, and the hollow portion 29' of one rail is inserted with the insertion piece 29 of the other rail to be coupled with the connection portion B' of the rail 55.

Figure 23A:
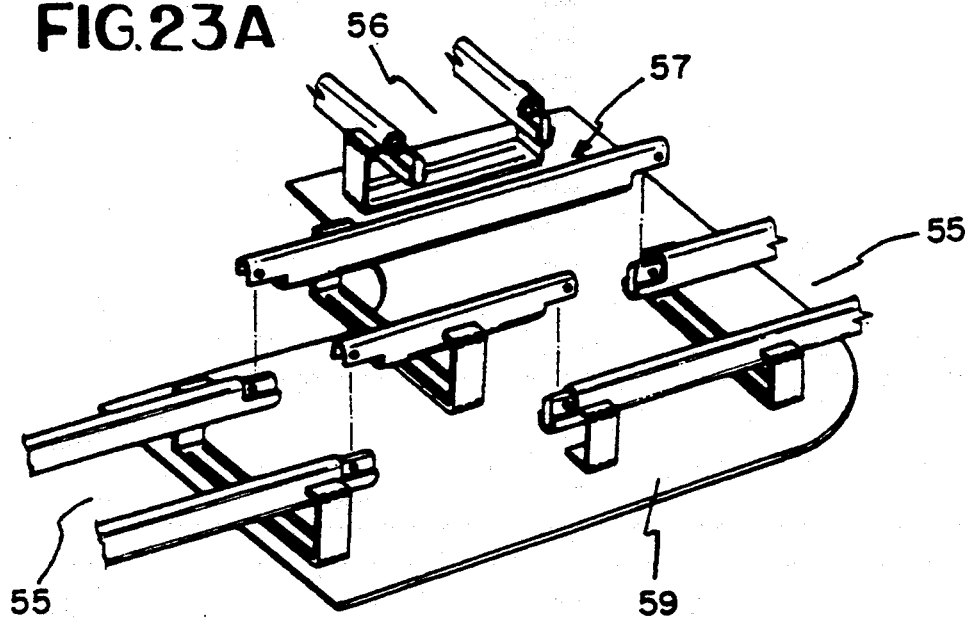
FIGS. 23A and 23B are perspective views illustrating a straight connection rail or a curved connection rail coupled at an intersection of the rails according to the present invention.
Figure 23B:
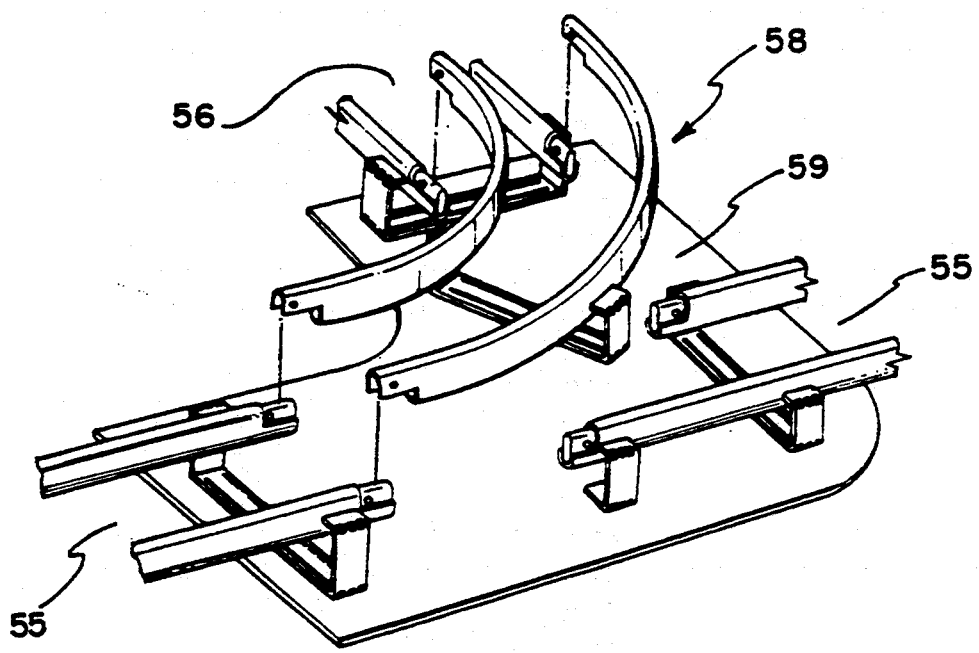

FIGS. 23A and 23B illustrate another example of the direction control unit which is mounted at each of the branched points of the rails. The respective ends of the rails 55 and 55' and a movable rail 56 are straight or normally mounted on the branch plate 59 at a regular interval. The straight connection rail 57 is provided between the rails 55 and 55'. Alternatively, a curved connection rail 58 is provided between the rail 55 and movable rail 56 to form the curved connection rail structure.

Preferably, the car C carries the seedlings, the fertilizers and farming tools needed to cultivate the crops. The track rail assembly B and the car are installed in the vinyl house A according to the present invention. They may be installed in a fruit culture farming, a special-use cultural farming and a cattle shed.

The car C includes an electromotive track rail C1 having a power source and a simple rail C2 on which any power unit is not provided, as shown in FIGS. 24 through 29.

Figure 24:
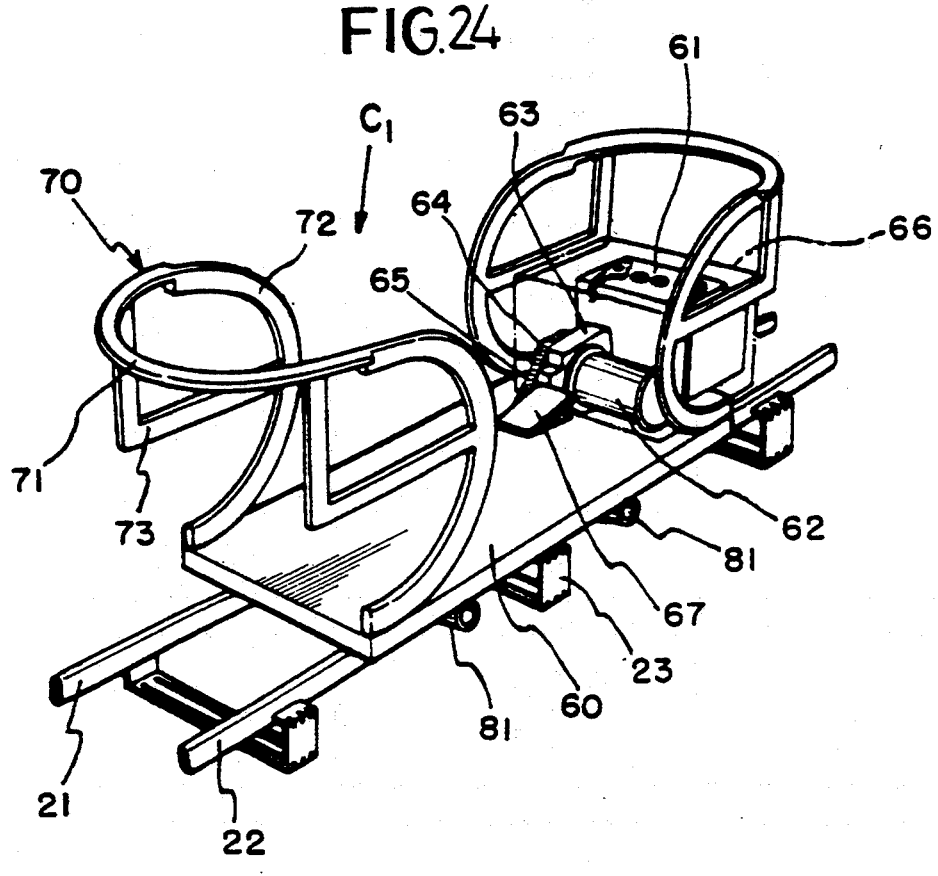
FIG. 24 is a perspective view of an orbiting car according to the present invention.
Figure 25A:
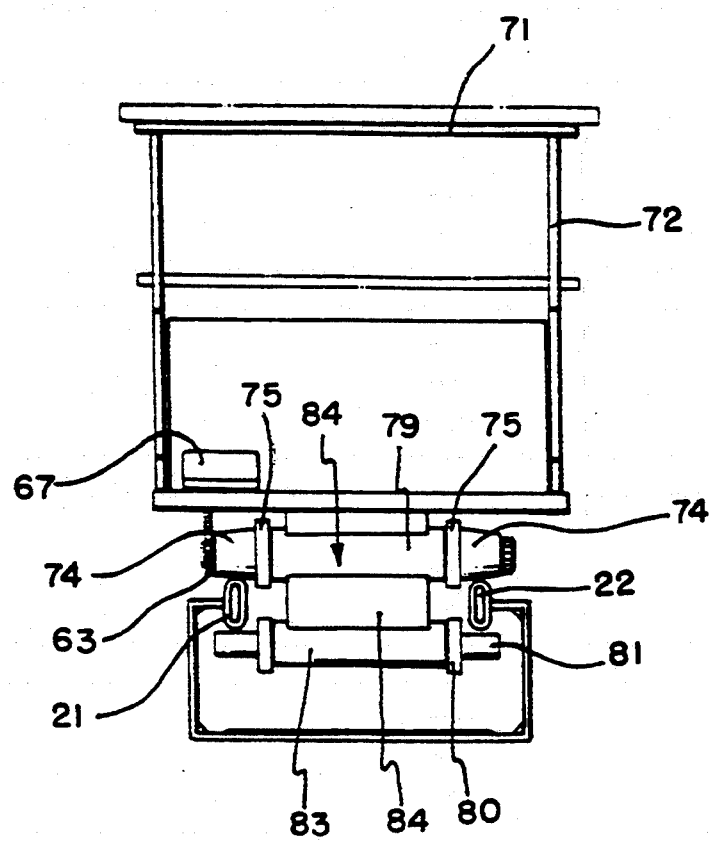
FIGS. 25A and 25B are front and side views of the car shown in FIG. 24.
Figure 25B:
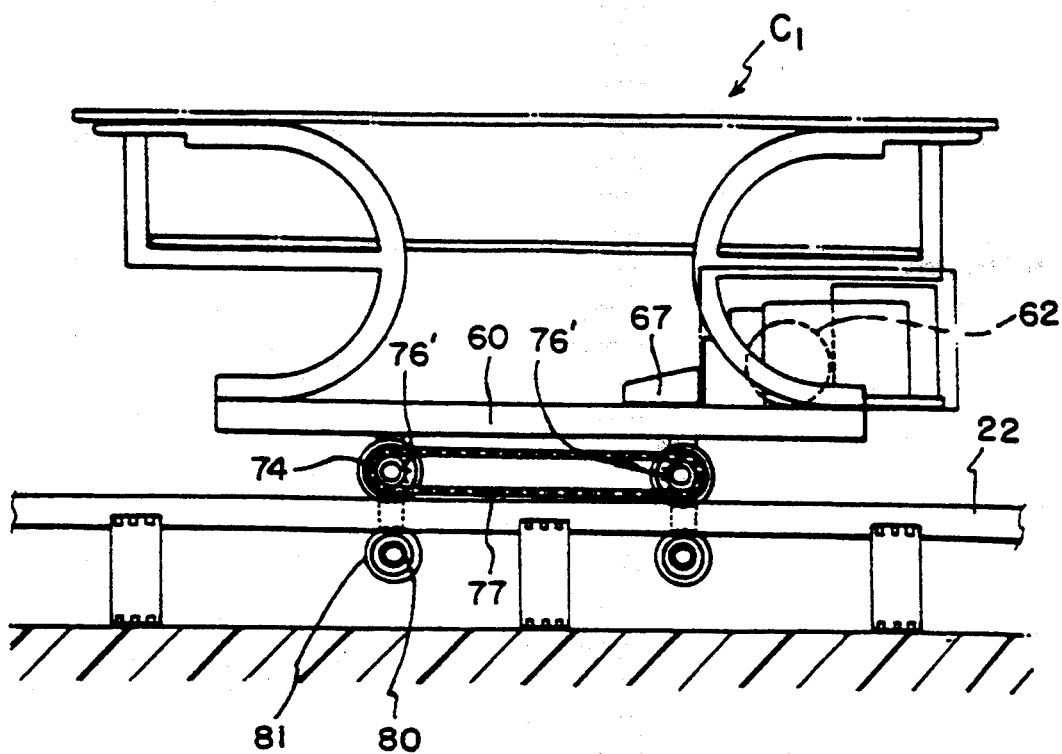
Figure 26:
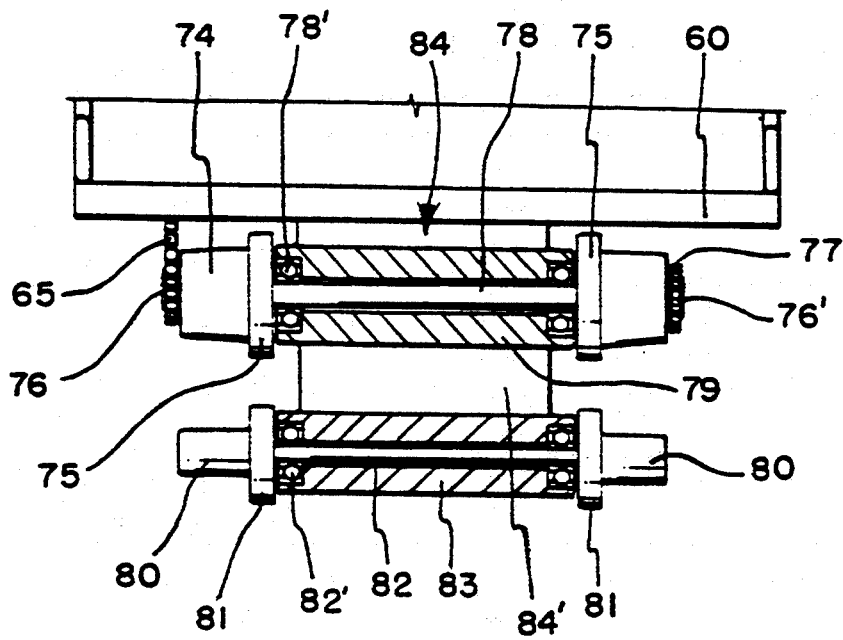
FIG. 26 is an exploded cross-section view showing main parts of the car.
Figure 27:
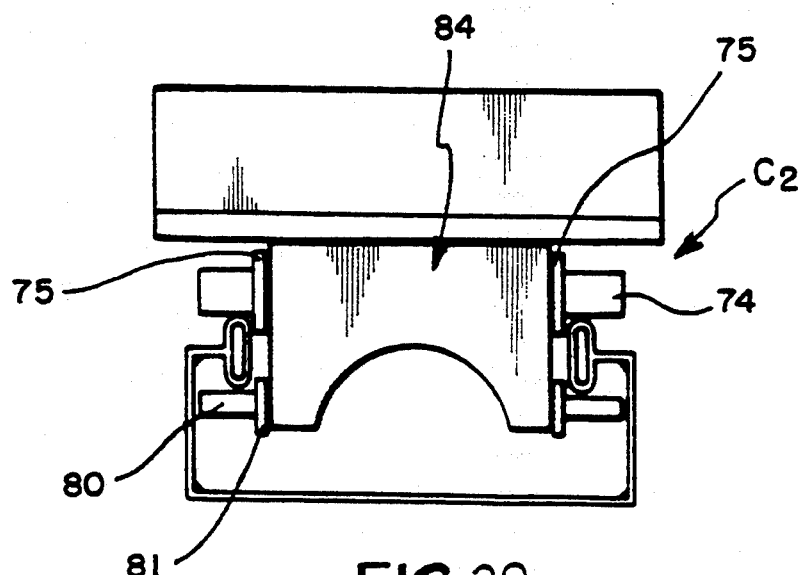
FIG. 27 is an exemplary view showing a car according to another example of the present invention.

FIG. 24 is a perspective view of an example of the electromotive car, FIGS. 25A and 25B are a front and side views showing the car C1 installed on the rail 20 and FIG. 26 is a partially exploded cross-section view of main parts of the electromotive car C1. The power orbiting car C1 includes a main body, a power link generating portion which generates a power force needed to run the car C1 and a driving unit which includes driving wheels to transfer the power force to the driving wheels.

In the main body of the car 41, the main body includes a main plate 60 and a support frame 70 which is fixed to the front and rear portions of the main plate 60. In the support frame 70, the horizontal support frame 71 and vertical support frame 72 are integrally formed and a supporting bar 73 is secured at the lower side of a position in which the horizontal supporting frame 71 and vertical supporting frame 72 are changed.

In the power supplying portion, a power voltage from the battery 61 is supplied to a driving unit. The motor 62 is reduced by means of a speed reducing box 63. A driving gear 63 rotatably pivoted to the speed reducer 63 is connected to driving wheels and driving gear 76 through a chain 65.

The driving portion is mounted at the lower side of the main body plate 60 and serves to smoothly run the car C on the track rail assembly B. According to the driving portion, a pair of an axle shaft assembly 84 in which upper and lower axle cylinders 79 and 83 are provided is arranged on the lower side of the main body plate 84 at a regular interval. Axle shafts 78 and 82 are inserted and mounted in the axle shaft cylinders 79 and 83 of the axle shaft assembly 84. Further, secession preventing wheels 75 and 81 are inwardly formed at opposed ends of the respective axle shafts 78 and 82. At the upper side of the secession preventing wheel, the driving wheel is defined while at the lower side of the secession preventing wheels a driven wheel 80 is also defined.

In the car C employing the main body portion, power supplying portion and the driving portion, the electromotive car 1 and the manual car C2 are different in structure in accordance with different driving manner. The electromotive orbiting car C1 has a power generator and is driven arranged at a part of the upper and lower side, as shown in FIGS. 25A, 25B and 26. The driving gear 76 is secured to the driving wheel 74 positioned at the lower side of the starting gear 64. The driving gear 76 and the moving gear 64 are connected by means of the chain 65, while a cooperating gear 76' is mounted to the other driving wheels 76, and the gear 76' and the wheels 76 are connected by means of a chain 77.

The electromotive car C1 thus constructed can be operated automatically or manually. In order to tun the car C1 manually, the car C1 can be operated by using a pedal 67. Alternatively, an automatic operation of the car C1 can be achieved by using a remote controller which is provided to the car C1.

When the power voltage of the battery 61 is supplied to the motor 62 by using the pedal 67 or remote controller, the motor 62 is rotated under a reduction in speed by the speed reduction box 63 and the gear 64 is then rotated in accordance with the rotation of the motor 62.

Upon rotation of the gear 64, the driving gear 76 which is connected to the gear 64 through the chain 65 is also rotated to drive the driving wheel 74. At this time, the gear 76 and chain 77 which are connected to the corresponding driving wheel 74 are simultaneously operated to drive the remaining wheels 74. Accordingly, the car C1 runs along the rails 20.

Meanwhile, in the simple track car C2, the axle shaft assembly 84 having the driving wheels 74 and auxiliary wheel 80 is provided on the lower side of the main body plate 60. In fact, the simple track car C2 can be driven under traction of the electromotive track car C1 or a user and the car C2 can be serially connected if needed.

Preferably, multiple shelves, tool containers, or carrying boxes are provided in the simple track car C2 to carry the seedlings, the farming tools, the harvest and various farming machines. The car C of the present invention is characterized in that the drving wheel 74 and the auxiliary wheel 80 are arranged at the upper and lower sides of the rail 21. When the car C runs along the rail 20, the auxiliary rail 80 is contacted with the lower side of the rail 21 and the secession preventing wheels 75 and 81 of the respective wheels are positioned at the inside of the rails 21 to limit the vibration of the car C. Accordingly, the car C can be prevented from being departed from or turned over on the tracks when running the car C.

Referring to FIG. 27B, an exemplary view illustrating a case in which the car C on the track rail 20 is prevented from being departed or overturned.

In the construction of the driving unit of the track car C, the secession preventing wheels 35 and 81 of the driving wheel 74 and the auxiliary wheels 80 are formed at both sides of the respective wheels and the rail 21 is positioned between the secession preventing wheels 75 and 81. Accordingly, the vibration of the track car C and/or the secession or rollover thereof from the track rail 20 can be successfully avoided.

Figure 28:
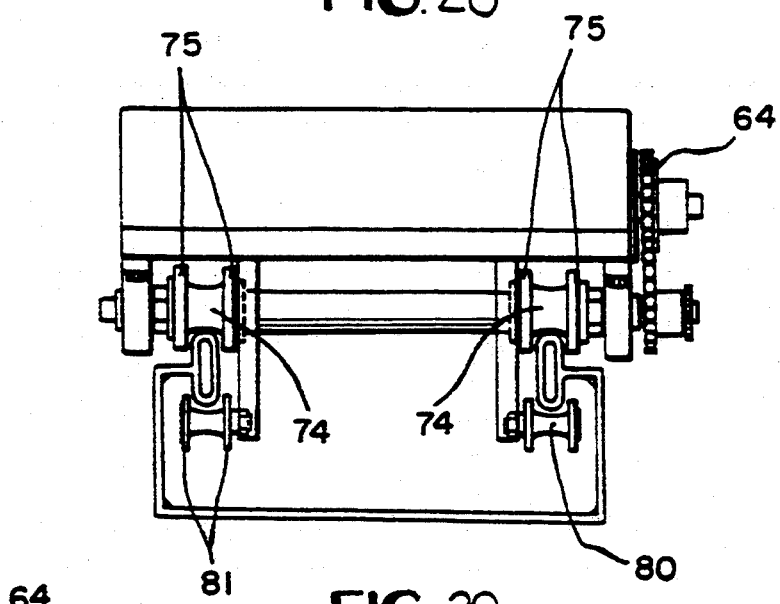
FIG. 28 is an exemplary view showing still another example of the car.
Figure 29:
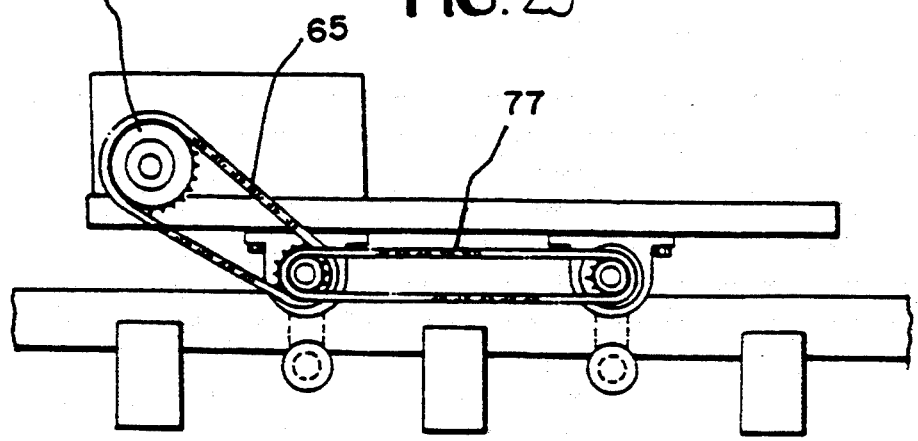
FIG. 29 is a view illustrating a power transferring mechanism of the car.

According to the present invention, a power transfer mechanism including the driving unit and the driven unit may be separately arranged at both sides of the track car C or at only one side thereof as shown in FIG. 28, with a result that the same effect is ensured.

Figure 30:
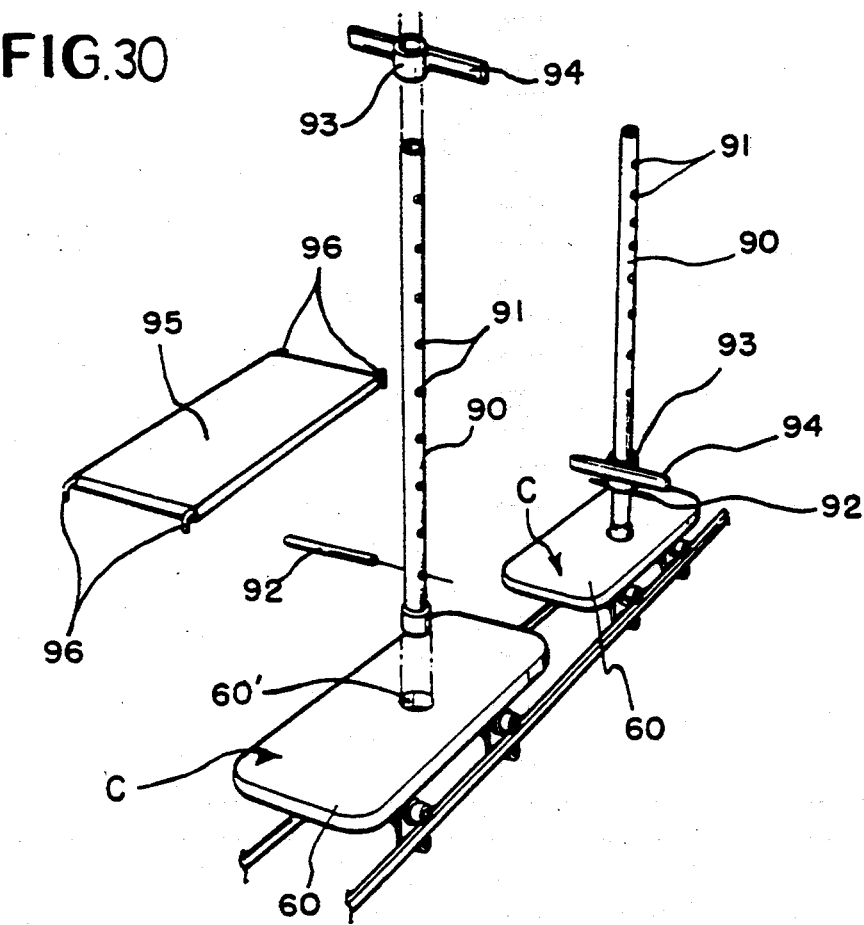
FIG. 30 is a view showing a working-die to be defined in the car.
Figure 31:
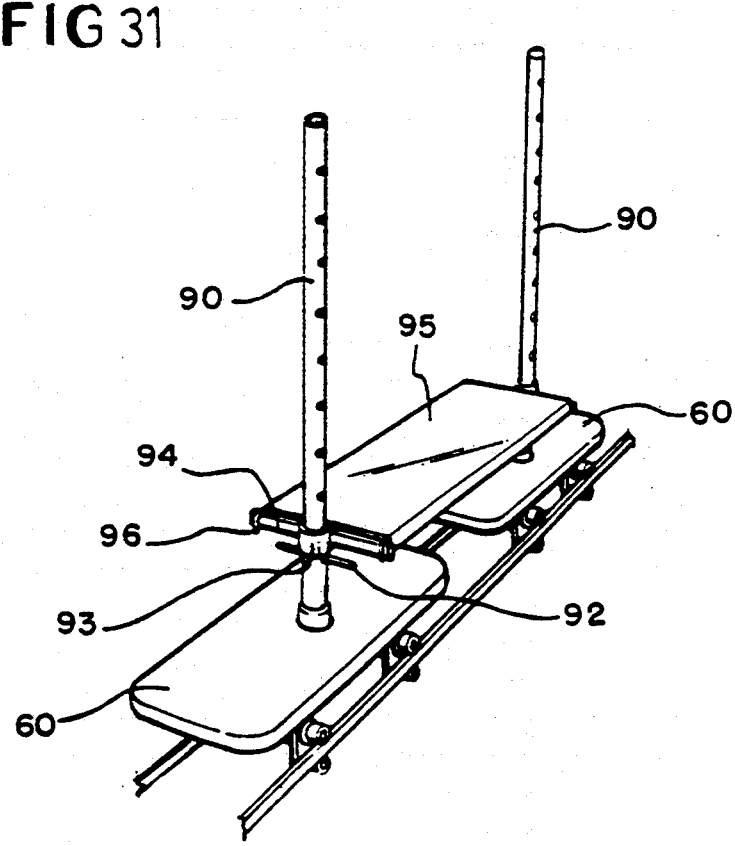
FIG. 31 is a view showing the working die arranged in the car.

Referring to FIGS. 30 and 31, a case in which the track car C is used as a carrying car or working car is illustrated.

More specifically, a fixing recess 60' is formed at the central portion of the main body plate 60, respectively and a column 90 having a plurality of holes 91 is inserted upright in the fixing recess 60', respectively. Consequently, an insertion bar 93 having a horizontally extended supporting member 94 is mounted on the column 90 and a fixing pin 92 is inserted in the hole 91 at a proper height to set the position of the supporting member 94. Between the track cars C on which the supporting member 94 is coupled with the column 90, hook-shaped pins 96 of a shelf 95 are hooked to the supporting members 94. The shelf 95 can be provided in multi stages as needed so as to carry a large quantity of the farming tools or crops simultaneously. Furthermore, the car may be used as an auxiliary working car so that a user sits on the car to effect any working as needed.

Figure 32:
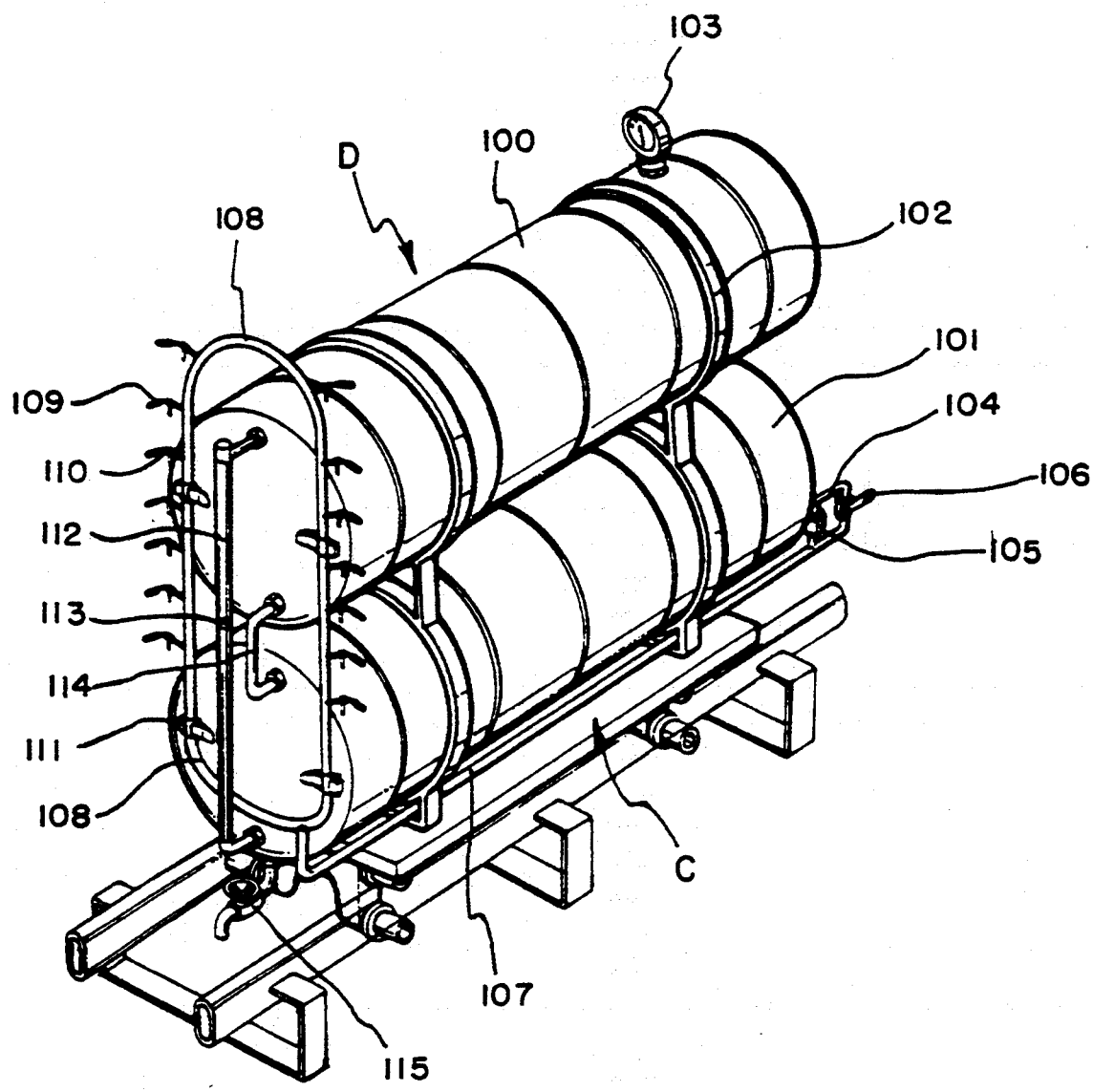
FIG. 32 is a perspective view of an agriculture chemical spraying unit which is employed in the present invention.
Figure 33B:
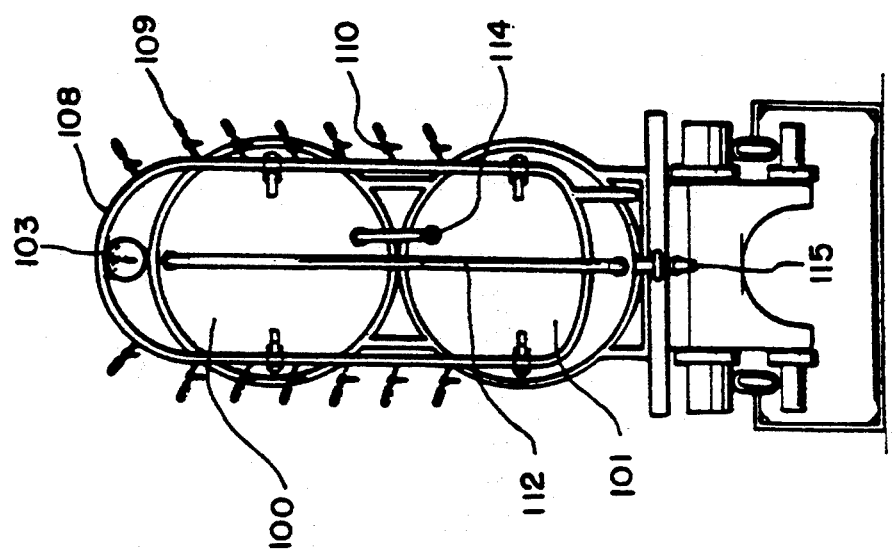
FIG. 33A and 33B are a side view and a front view of the agricultural chemical spraying unit.
Figure 33A:
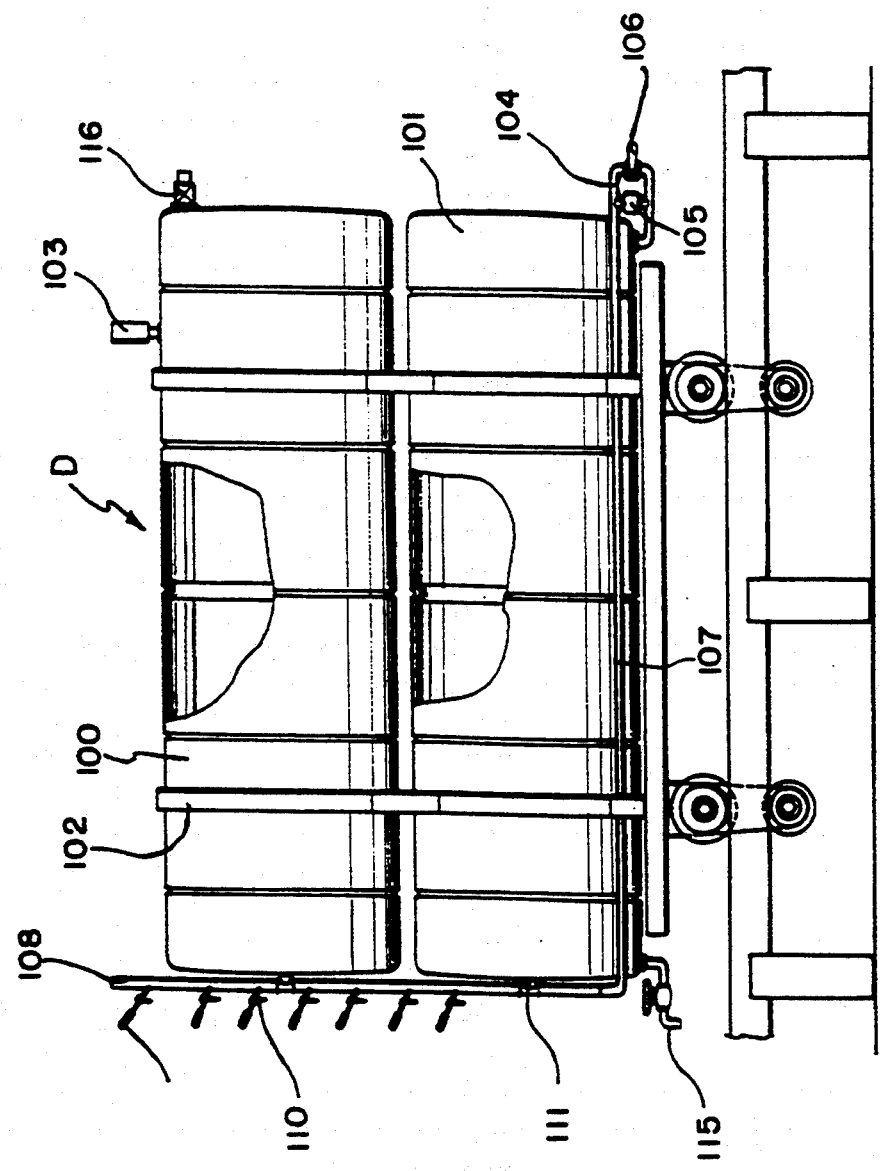

According to the present invention, various tools needed to cultivate the crops can be loaded on the track car C, as shown in FIGS. 32, 33A and 33B, wherein FIG. 32 is a perspective view of the agricultural chemical spraying unit D loaded on the track car C and FIGS. 33A and 33B are a side view and a front view of the agricultural chemical spraying unit D. In general, various agricultural chemicals are supplied to the crops from time to time until the seedling is completely grown. The agriculture chemicals, however, are virulently poisonous and harmful to a user. For this reason, careful attention must be paid when the agricultural chemical is sprayed on the crops. Particularly, more careful attention must be paid when the agricultural chemicals are used in a closed space such as a vinyl house.

In the agricultural chemical spraying unit of the present invention, the diluted agricultural chemicals and air are mixed in upper and lower tanks and, therefore, the agricultural chemicals is scattered from an injection nozzle to thereby achieve a good spraying effect in a closed space such as a vinyl house.

The agricultural chemical spraying unit D can be loaded on the electromotive track car C1 or simple track car C2. When the electromotive track car C1 having the agricultural chemical spraying unit D has a remote controller or the track car C2 having the agricultural chemical spraying unit D loaded thereon is pulled by the electromotive track car C1 having a remote controller, the agricultural chemicals can be automatically sprayed. Alternatively, when the agricultural chemical spraying unit D is loaded on the simple track car C2, the agricultural chemicals can be manually sprayed on the crops.

In the agricultural chemical spraying unit D of the present invention, the upper tank 100 and the lower tank 101 are fixed by means of fixing member 102 and connected to each other through a connecting pipe 114.

An injection pipe 108 located at the front side of the unit D and a discharge pipe 104 are connected in a fluid communication relation through a transport pipe 107 and an electromagnetic valve 105 and a manual control valve 106 are disposed between the discharge pipe 104 and the transport pipe 107. The injection pipe 108 has a plurality of injection nozzles 9 having an openable valve 110, respectively. A pressure meter 103 and a fluid supplying valve 116 are formed at the upper surface and the rear surface of the upper tank 101 and a fluid discharging valve 115 and a residual content indicating tube 112 having a content indicating ball 113 built therein are provided on the lower tank 102. In the drawings, reference numeral 111 denotes a fixing piece.

The agricultural chemicals spraying unit D thus constructed can be used easily. Firstly, the agricultural chemical is diluted by mixing it with water and forceably injected in the upper tank 100 through the injection valve 116. Consequently, the air is also injected through the injection valve 116. Such an injection of the air can be easily effected by means of a compressor (not shown) and is carried out until a predetermined pressure is ensured in the tank. The pressure in the tank 100 is indicated by the pressure meter 103. After the agricultural chemicals and the air are injected in the tanks, the agricultural chemicals spraying unit D is moved to a place where the agricultural chemicals is sprayed. The agricultural chemicals can be sprayed automatically or manually as previously described.

With the automatic spraying method, the track car C is run and the electromagnetic valve 105 is opened under control of a remote controller. At this time, the diluted agricultural chemical is sprayed from injection pipe 108 via the transport pipe 107 by way of the inner pressure of the tank and an amount of the agricultural chemical to be sprayed can be controlled according to an opening degree of the openable valve 110. The residual content of the agricultural chemicals in the tanks 100 and can be seen by the indicating ball 113 of the residual content indicating tube 112.

On the contrary, the manual spraying method can be effected by handling the manual valve 106 directly. In this case, the spraying operation is carried out in the same manner as the automatic spraying method described above. Preferably, the automatic spraying method can be substantially employed when the agriculatural chemicals are sprayed to the growing seedlings while directly viewing them; whereas, the manual spraying method can be mainly employed when the seedlings are grown to a constant size or are in the havesting season.

In particular, the agricultural chemical sprayed from the injection nozzle 107 is scattered in a manner of fog to be permeated into entire parts of the seedlings. Accordingly, damage by blight and harmful insects can be improved considerably, as compared with ordinary methods.

In addition, when the automatic spraying method using the agricultural chemical spraying unit D is carried out within a closed space such as a vinyl house A in summer, dangers resulted from the agricultural chemicals can be effectively prevented.

In a case that various crops are cultivated in the vinyl house A, the crops are well grown under a warm and mild weather in spring, summer and autumn but they are likely to be frozen in winter.

To overcome the drawback innediately above mentioned, twofold or threefold vinyl is employed to set up the vinyl house A so as to retain heat. But, the temperature in the vinyl house A may drop suddenly. This causes the crops to be damaged due to the decrease of the temperature in the vinyl house A. For this reason, a proper heating unit such as a temperature control means must be installed in the vinyl house A to keep the temperature in the vinyl house constant.

According to the present invention, a hot air heating unit E serving as a temperature control means is provided, considering the situation previously mentioned.

The heating unit E of the present invention heat-exchanges the air from a blower with the heated air from a heating burner and supplies the heat-exchanged hot air into the vinyl house A through the duct F so as to keep the temperature in the vinyl house A at the normal temperature.

Meanwhile, compost and/or artificial manure supplied to crops is apt to ferment and, thus, nitric acid gas, nitrous acid gas, ammonia gas and the like are produced. These gases have a specific gravity of 1.3–1.8 times that of an air. As seen from the afore-mentioned fact, when the crops are closely planted, it is difficult to discharge the gases.

According to the present invention, the gases are forceably circulated and exhausted by an air circulating pressure effected by means of the heating unit E.

The operation of the heating unit E causes a combustion gas. This gas is well exhausted at the time of the initial operation of the heating unit E. But, when the heating unit E is operated for a long time, the combustion gas and soot are deposited on the inner wall surface of the heat-exchanging chamber of the heating unit E. As a result, a combustion efficiency of the heating unit E is decreased and an imperfect combustion of gas occurs thus occurred. The harmful gases are gradually deposited on the inner wall surface of the heat-exchanging chamber of the heating unit E to thereby undesirably decrease an efficiency of the heating unit E. Further, the inner wall surface of the heat-exchanging chamber is corroded by sulfurous acid gas contained in the harmful gases. Accordingly, a lifetime of the heating unit E is shorten considerably. Besides, if the sulfurous acid gas is introduced into the vinyl house, not only crops are blighted but also workers are harmfully affected by the gas.

In order to prevent the workers and crops from being damaged due to the harmful gases including sulfurous acid gas and provide an extended lifetime and improved heat efficiency of the heating unit E, it is required that the interior of the heat-exchanging chamber must be washed by water to remove the harmful gases and soot deposited on the inner wall surface of the heat-exchanging chamber.

The heating unit E of the present invention, in addition to the heating effect in the vinyl house A, has a function of cleaning the heat-exchanging chamber, which will be later described.

Figure 34:
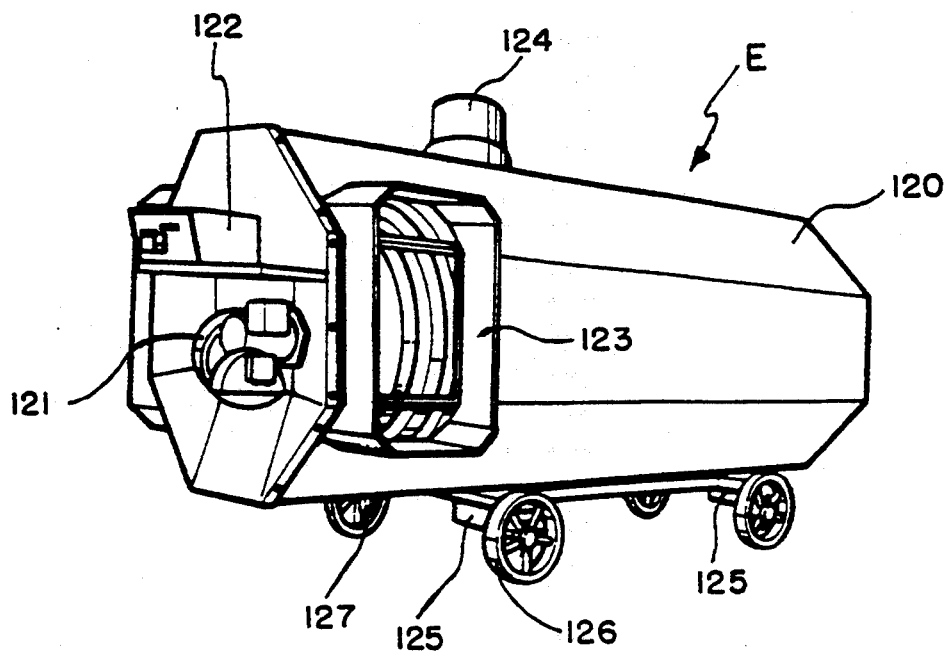
FIG. 34 is a perspective view of a heating unit employed in the present invention.
Figure 35A:
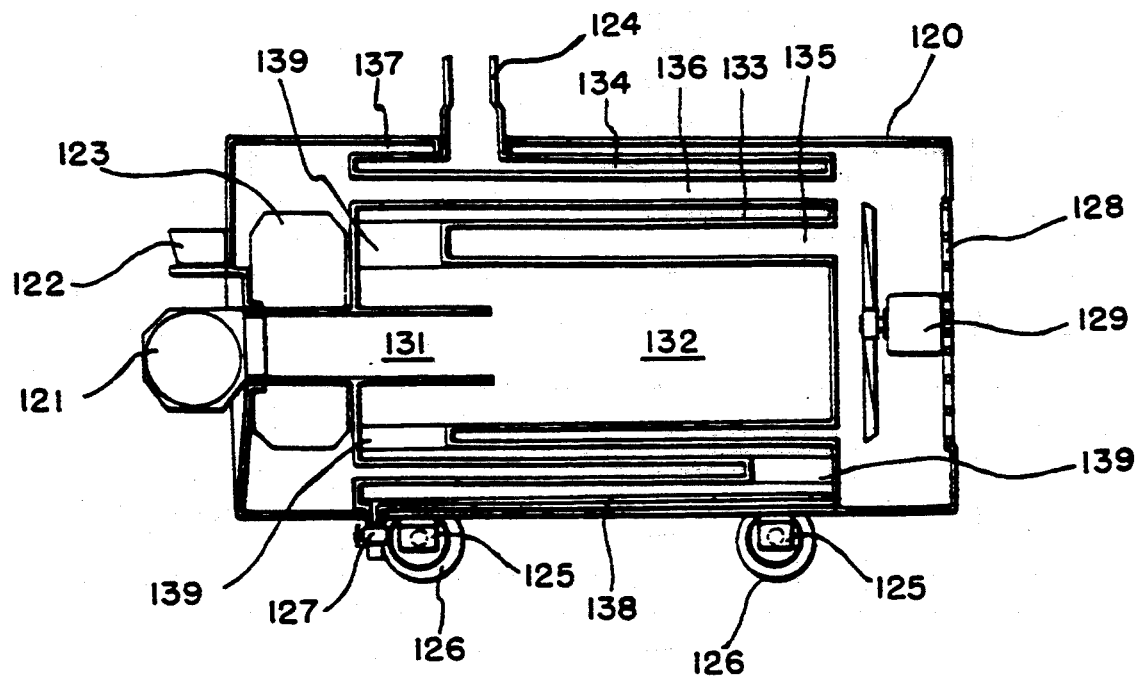
FIGS. 35A and 35B are a side cross-section view and a front view of the heating unit shown in FIG. 34.
Figure 35B:
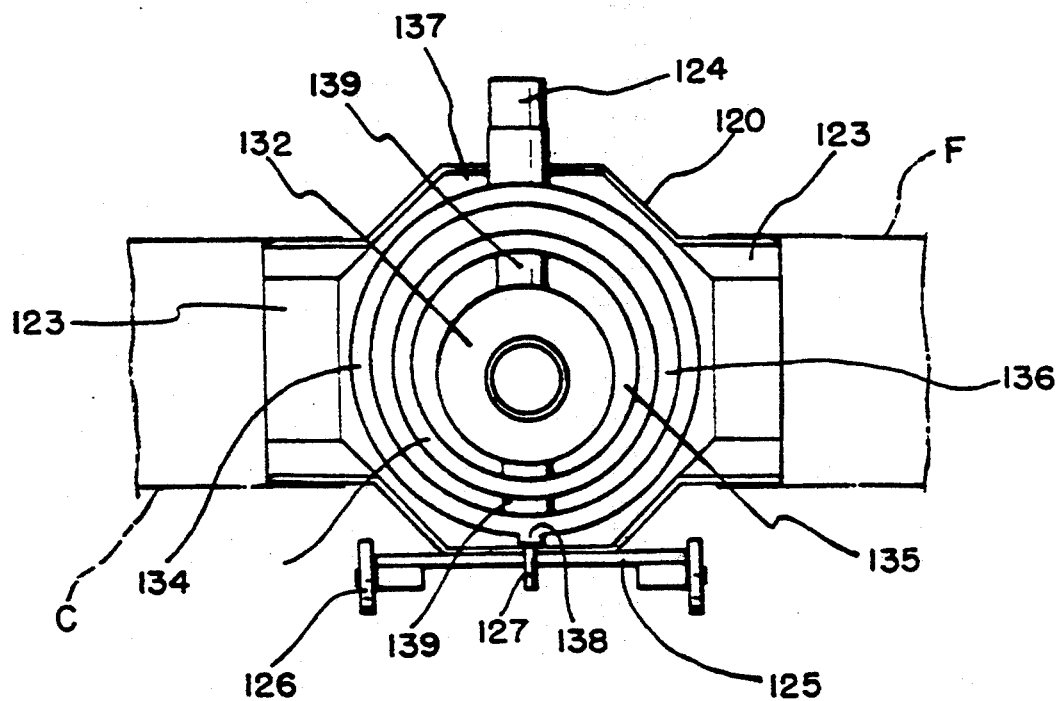
Figure 36:
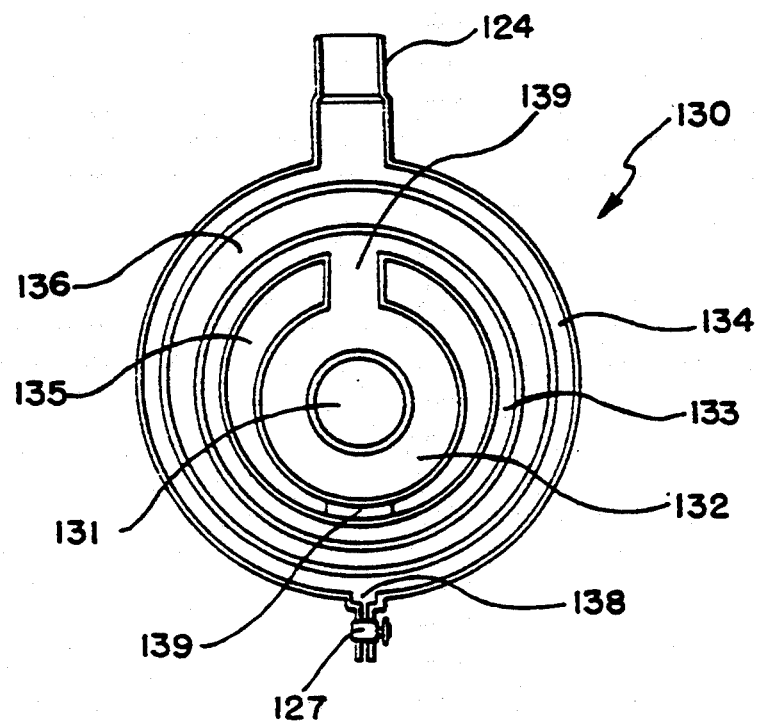
FIG. 36 is a front cross-section view of the heating unit shown in FIG. 34.

FIG. 34 is a perspective view of the heating unit E, FIGS. 35A and 35B are cross-section views of the heating unit in FIG. 34 taken from the side and front thereof and FIG. 36 is a vertical cross-section view of a heat-exchanging chamber 130 taken from the front thereof.

The heating unit E is provided with a base member 125 which is horizontally disposed on a main body 120 and plural wheels 126 are provided at both sides of the base member 125 so that the heating unit E is moved easily.

In the sides of the main body 120, hot air exhausting openings 123 are formed respectively. The main body 120 has a closed front surface at which the heating burner 121 is forwardly exposed and an opened rear surface at which an air introducing portion 128 is formed. The burner 121 burns a light oil to generate heat. The blower 129 is attached to the rear surface of the main body 120. The heating burner 121 and the blower 129 are controlled by a control box 122 which is located on the front surface of the main body 120 or in the vicinity of the main body 120.

A heat-exchanging chamber 130 is designed in the main body 120 such that the chamber 130 is defined between the front and rear surfaces with a constant space. The heat-exchanging chamber 130 includes a first circulating chamber 132 of a simple cylindrical shape and an annular second and third circulating chambers 133 and 134, each having a different diameter, disposed at the outside of the first circulating chamber 132, which are arranged in order. The second and third circulating chambers are spaced to define air channels 135 and 136. The circulating chambers are connected by means of the tube 139 connection in a fluid communication.

The first circulating chamber 132 of the heat-exchanging chamber 13 is connected to a hot air exhausting pipe 131 which is engaged to an outlet of the heating burner 121. The hot air exhausting pipe 131 is extended into the first circulating chamber 132 by a constant length.

At the third circulating chamber 134 an air exhausting pipe 124 is upwardly projected and, at the lower side of the main body 120, a waste water collecting path 138 is integrally formed. A water discharging valve 127 is downwardly formed at one side of the waste water collecting path 138.

The heating unit E thus constructed is disposed at one side of the vinyl house as shown in FIG. 1. More specifically, the front portion of the main body 120 including the air exhausting pipe 124 in which a storepipe is inserted is located inside the vinyl house A while the rear portion thereof is externally exposed. The duct F is coupled to the hot air exhausting opening 123. Furthermore, the farming system of the present invention contemplates that a separate hot air heating room is designed in an integral manner with the vinyl house A in the vicinity of the exposed portion of the heating unit E so as to protect the heating unit E from the external shock and/or damage and to circulate the air in the vinyl house A by an air introduced to the heating unit E or introduce an external clean air into the vinyl house A.

Figure 37A:
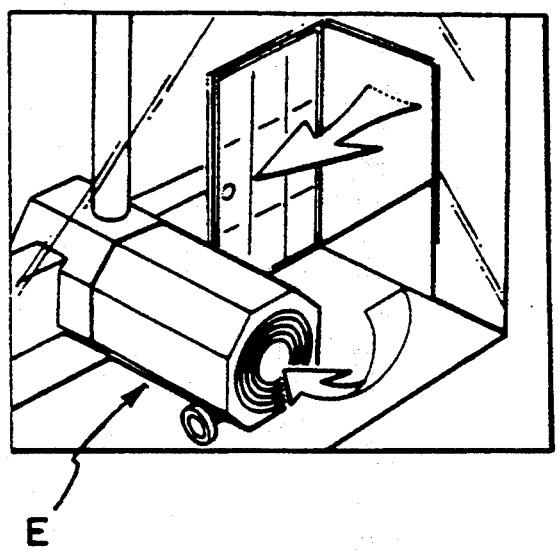
FIGS. 37A and 37B are exemplary views for explaining introduction or discharge of an outdoor air to the heating unit.
Figure 37B:
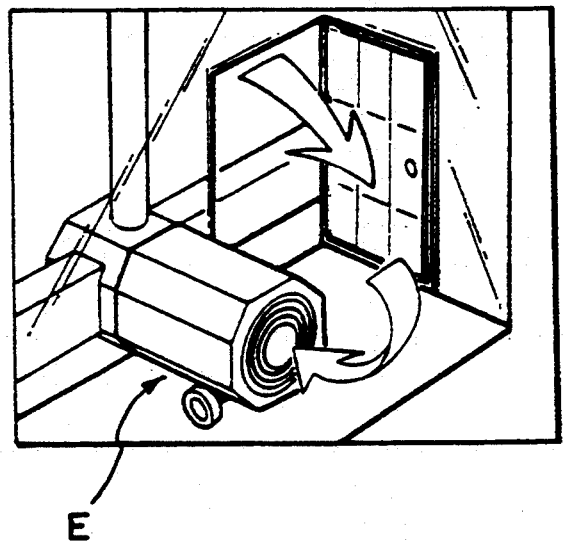

As shown in FIG. 37A, if the external air is introduced into the vinyl house A, then oxygen nitrogen, carbonic acid gas and the like contained in the atmosphere are introduced into the vinyl house A and thereby maintain the interior of the vinyl house A in the same condition as the atmosphere. As a result, the crops can be grown without being effected by the condition in the vinyl house. Also, since the external air is introduced in the vinyl house, the temperature and humidity in the vinyl house can be properly controlled. Accordingly, the temperature and humidity in the vinyl house can be freely controlled in conforming to the variation of the day and night or seasons.

When the heating burner 121 and blower 129 are operated under switching ON of the control box 122, the hot air containing the combustion gas produced in the heating burner 121 is introduced into the first circulating chamber 132 through the heat emitting tube 131. After the hot air is circulated through the second and third circulating chambers 133 and 134, the hot air is externally exhausted from the vinyl house via the chimney defined in the air exhausting tube 124.

During circulation of the hot air through the respective circulating chambers 132, 133 and 134, a cool air forceably blown by the blower 129 is heat-exchanged by passing through the air flowing passages 135, 136 and 137 defined between the respective circulating chambers 132, 133 and 134 to obtain a heated air which, in turn, is supplied to the respective ducts F through the hot air exhausting opening 123. The hot air supplied to the ducts F is discharged through minute holes formed in the respective ducts F to heat the indoor temperature of the vinyl house. Accordingly, even if the heating unit E is operated during a severe winter, the interior of the vinyl house A can be maintained to the proper normal temperature, with a result that crops can be well grown.

When the heating unit E is operating for a long time, various harmful gases including soot are likely to be deposited on the inner wall surface of the respective circulating chambers. As a result, the heating efficiency of the heating unit is deteriorated and the lifetime thereof is undesirably shortened. Further, the harmful gases affect the workers and/or the crops. Accordingly, the soot and harmful gases must be removed to avoid such harmful effects.

If gasoline or petroleum is used as an operating oil, then sulfuric acid diluted by water is convenionally used to remove the soot deposited on the inner wall surface of the respective chambers 132, 133 and 134.

When using sulfuric acid, the soot is not easily removed and the wall surface of the chambers 132, 133 and 134 are likely to be damaged.

According to the present invention, a light oil is used as an operating oil of the heating unit E. Substantially, the light oil contains sulfurous acid and if the oil is burned, then the soot and sulfurous acid are deposited on the lower side of the inner wall of the air heater at a ratio of 2~1.5:1. Under this condition, when a washing water is supplied to the inner walls, the washing water reacts with the sulfurous acid deposited on the wall surface to produce a sulfuric acid serving as a washer. More specifically, the washer is produced by a reaction of $SO_4 + H_2O \rightarrow H_2SO_4$. As a result, the soot and sulfurous acid can be easily dissolved and removed within approximately 10 to 20 minutes.

The heating unit E according to the invention is designed to clean up the harmful gases or the soot therein effectively.

To clean the harmful gases, the stovepipe and ducts are first removed from the air exhausting tube 24 and the hot air exhausting opening 123 and the heating burner 121 is then removed. After an end of the heat emitting tube 131 is closed by way of a proper method, the heating unit E is moved to a proper place. In this case, the heating unit E can be moved by the wheels 126 provided at the bottom thereof. After completing the move of the heating unit E, under a condition of using the water dischanging valve 127, a separate transparent hose is inserted to the water discharging valve 127 by a predetermined height and the washing water is supplied through the exhausting tube 124. Thus supplied washing water is accommodated from the third circulating chamber 134 to the second and first circulating chambers 133 and 132. In this case, the washing water is continuously supplied until the water level reaches a proper height in the second circulating chamber 124. This water level can be indicated by an indicating portion defined on the external wall of the heating unit E. When supplying the washing water is completed, it is exposed for approximately 10 to 20 minutes until the harmful gases including the soot are dissolved by the washing water.

After the harmful gases and soot have been dissolved, waste materials are deposited in the waste water collecting path 138 and in the vicinity of the path 138. In this case, the washing water is contaminated by cleaning the harmful gases and soot. When the harmful gases and soot have been completely dissolved, the water discharging valve 127 is opened so as to externally discharge the dissolved residual materials. After the discharge of the contaminated washing water has been completed, a new washing water is again supplied through the air exhausting pipe 124 to the heating unit E so as to remove the waste materials remaining in and around the waste water collecting path 138.

Consequently, the chambers of the heat-exchanging chamber 120 which are completely cleaned are exposed until the chambers are naturally dried. Alternatively, if only the heating burner 121 is coupled to the heating unit E, the heating unit E may be operated to dry the chambers completely.

The heating unit E thus dried is employed to control the temperature of the vinyl house.

Such washing may be conducted when cold weather has passed and the heating unit E is not required to be activated.

Use of the washing only once or twice a year makes it possible to use the unit E with high efficiency for a long time and to protect the users and the crops from various harmful gases.

As described above, a farming system for cultivating and managing various crops according to the present invention provides a vinyl house A which is very solid and incorporates a spacious cultivation area therein without the use of supporting pillars. A track rail structure B and an orbiting track car C easily convey harvests and various units necessary for cultivation in the farming area, an agricultural chemical spraying unit D for preventing the crops from being damaged by blight and harmful insects, and heating unit E for producing warm air in cold weather and furnishing the air to the crops on the levees G through duct F, whereby cultvating the crops in cold weather due to the warm indoor air and producing the crops all year round regardless of the change of seasons.

Although the present invention has been described with reference to specific examples, it is to be understood that various modifications and changes will be made therein without departing from the spirit and scope of the invention.

What is claimed is:

1. A farming system for cultivating crops, comprising:
   a housing for providing a farming area having levees defined therein, said levees defining a plurality of smaller areas within said housing;
   a plurality of track rails and a plurality of ducts arranged on alternate ones of said smaller areas between the levees;
   means provided on said track rail, for carrying farming tools needed to cultivate said crops and the harvest produced on said levees;
   agricultural chemical spraying means, loaded on the means for carrying, for spraying agricultural chemicals on said crops; and,
   temperature control means for supplying a hot air through said duct arrangement to said crops growing on said levees.

2. The farming system according to claim 1, wherein said housing includes a plurality of vertical bars and horizontal bars each of said vertical and horizontal bars being formed of rectangular pipes arranged such that said vertical bars cross said horizontal bars, connecting members for supporting said crossed horizontal and vertical bars at crossing points thereof, and coupling pins surrounding said rectangular pipes, the coupling pins being opposed to each other and fixed to one of said horizontal bar or vertical bar, wherein said connecting members have a pair of supporting pieces which are opposingly defined on upper and lower sides of a flat plate, each of said supporting pieces having a reinforcing side and an inwardly formed recess, respectively, said coupling pin being made by a single steel line curved at both sides centering around a bend portion, one side of said coupling pin being closed and serving as a fastening portion and the other side being formed by cutting the steel lines in an arc shape and serving as a coupling portion.

3. The farming system according to claim 1, wherein said housing includes at least one vertical bar and at least one horizontal bar each of which are formed of oval pipes arranged such that said at least one vertical bar crosses said at least one horizontal bar, connecting members for supporting the crossed horizontal and vertical bars, and coupling pins for fixing the crossed horizontal and vertical bars together, wherein said connecting members each include two pair of supporting pieces with one pair opposingly formed on upper and lower sides of a flat plate, respectively, each of the supporting pieces having a reinforcing side and an inwardly formed recess, and each of said coupling pins includes a coupling portion engaged to said horizontal bar and a coupling piece fixedly inserted into a coupling opening of said upper horizontal bar.

4. The farming system according to claim 2, further comprising supporting bars for connecting a pair of horizontal bars in vertical alignment, said supporting bars being alternately formed in a vertical type and an inclined type such that said supporting bars in combination with said pair of horizontal bars form a horizontal bar frame having an improved strength, wherein both ends of said respective horizontal bars are formed with a coupling opening through which a connecting piece is inserted to said adjacent horizontal bars and integrally secured with said bars by a bolt and nut arrangement.

5. The farming system according to claim 1, wherein said track rail means includes track rails, a direction control unit and a changeable branch plate having a straight connection rail or a curved connection rail loaded thereon.

6. The farming system according to claim 5, wherein said track rails include a pair of rectangular rails bent at upper and lower ends thereof and have a hollow portion defined therein, respectively, and rectangular brackets provided to said rail pair at a regular interval, wherein said rectangular brackets are located at the lower side of said rails, an inward piece is formed on an external surface of said respective rails, an inclined reinforcing portion and a bending portion are formed on corner portions and flat plates of said bracket to reinforce the strength of the bracket, and a fixing hole is centrally formed on said flat plat of said bracket.

7. The farming system according to claim 5, wherein said direction control unit includes a straight rail and a curved rail connected so that an end of the curved rail is continuously connected to the straight rail, a left receiving box and a right receiving box mounted at opposed portions of said connected rail, wherein said rails are partially removed from a portion where an inside linear rail and an outside curved rail are intersected, and a direction changing support including an externally exposed handle and a changeable rail having an end received in said right or left receiving box, said changing rail having an inside curved surface and an outside linear surface.

8. The farming system according to claim 1, wherein said means for carrying various farming tools and/or the harvest includes an electromotive track rail car having an integrated power source of a simple rail car without any external power source.

9. The farming system according to claim 8, wherein said power rail car includes a main body, power generating means for generating the power to run said car and a driving unit including driving wheels for transferring the generated power to the driving wheels, wherein said main body includes a main plate and a support frame fixed to front and rear portions of said main plate, said support frame having a horizontal support frame and vertical support frame integrally formed and a supporting bar secured at the lower side of a position where said horizontal supporting frame and vertical supporting frame are changed, said power generating means including a battery connected to a driving motor which is reduced by a speed reducer box, a driving gear rotatably pivoted to the speed reducer box and connected to the driving wheels and driving gear through a chain, a pair of an axle shaft assembly having upper and lower axle cylinders arranged on a lower side of said main body plate at a regular interval, axle shafts inserted and mounted in said axle shaft cylinders of the axle shaft assembly, and secession preventing wheels inwardly formed at opposed ends of said respective axle shaft at an upper side of the secession preventing wheel, wherein the driving wheel is provided at the lower side of said secession preventing wheels.

10. The farming system according to claim 8, wherein said simple track car includes an axle shaft assembly having driving wheels and an auxiliary wheel provided on a lower side of said main body plate, multiple shelves, tool containers, and carrying boxes provided in the simple track car.

11. The farming system according to claim 1, wherein said agricultural chemical spraying means includes an upper tank and a lower tank fixed to said means for carrying by fixing members and connected to each other through a connecting pipe, an injection pipe located at the front side of said spraying means, a discharge pipe connected in fluid communication to said injection pipe through a transport pipe, an electromagmetic valve and a manual control valve disposed between the discharge pipe and the transport pipe, said injection pipe having plurality of injection nozzles with an openable valve, respectively, a pressure meter and a fluid supplying valve formed at the upper surface and the rear surface of said upper tank, a fluid discharging valve, and a residual content indicating tube having a content indicating ball housed therein, the indicating tube being provided on said lower tank.

12. The farming system according to claim 1, wherein said temperature control means includes a base member horizontally disposed on a main body and plural wheels provided at both sides of the base member to enable movement of the temperature control means freely, said main body having a closed front surface at which the heating burner is forwardly exposed and an opened rear surface at which an air introducing portion is formed, said burner burning a heavy oil to generate heat, a blower attached to a rear surface of said main body, said heating burner and said blower being controlled by a control box located on the front surface of said main body or in the vicinity of said main body, a heat-exchanging chamber designed in said main body such that said chamber is defined between the front and rear surfaces with a constant space, said heat-exchanging chamber including a first circulating chamber of a cylindrical shape and an annular second and third circulating chambers, each having a different diameter, disposed at the outside of the first circulating chamber, which are arranged in order, said second and third circulating chambers being spaced to define air channels and said circulating chambers being connected by means of the tube in a fluid communication relationship, said first circulating chamber of the heat-exchanging chamber being connected a hot air exhausting pipe which is engaged to an outlet of the heating burner, said hot air exhausting pipe being extended into the first circulating chamber by a constant length, said third circulating chamber having an air exhausting pipe upwardly projected and, at the lower side of said main body, a waste water collecting path being integrally formed, and a water discharging valve being downwardly formed at one side of the water collecting path.

* * * * *